United States Patent
Yun et al.

(10) Patent No.: US 10,061,521 B2
(45) Date of Patent: Aug. 28, 2018

(54) STORAGE DEVICE AND METHOD OF OPERATING THE SAME

(71) Applicant: SAMSUNG ELECTRONICS CO., LTD., Suwon-si, Gyeonggi-Do (KR)

(72) Inventors: Hyun-Sik Yun, Hwaseong-si (KR); Sil Wan Chang, Yongin-si (KR); Jaesub Kim, Seoul (KR); Sangyoon Oh, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 151 days.

(21) Appl. No.: 15/273,826

(22) Filed: Sep. 23, 2016

(65) Prior Publication Data

US 2017/0131917 A1    May 11, 2017

(30) Foreign Application Priority Data

Nov. 9, 2015 (KR) .......................... 10-2015-0156933

(51) Int. Cl.
  *G06F 12/02* (2006.01)
  *G06F 3/06* (2006.01)

(52) U.S. Cl.
  CPC .......... *G06F 3/0611* (2013.01); *G06F 3/0656* (2013.01); *G06F 3/0659* (2013.01); *G06F 3/0665* (2013.01); *G06F 3/0679* (2013.01)

(58) Field of Classification Search
  None
  See application file for complete search history.

(56) References Cited

U.S. PATENT DOCUMENTS

| | | |
|---|---|---|
| 5,526,503 A | 6/1996 | Kim |
| 6,418,516 B1 | 7/2002 | Arimilli et al. |
| 7,383,382 B2 | 6/2008 | Mark et al. |
| 7,383,392 B2 | 6/2008 | Mark et al. |
| 7,679,133 B2 | 3/2010 | Son et al. |
| 8,443,174 B2 | 5/2013 | Kim et al. |
| 8,553,466 B2 | 10/2013 | Han et al. |
| 8,559,235 B2 | 10/2013 | Yoon et al. |
| 8,654,587 B2 | 2/2014 | Yoon et al. |
| 8,832,354 B2 | 9/2014 | Sokolov et al. |
| 8,874,824 B2 | 10/2014 | Luukkainen et al. |
| 2006/0112252 A1 | 5/2006 | Dixon |
| 2006/0271740 A1 | 11/2006 | Mark et al. |
| 2007/0276990 A1 | 11/2007 | Mosek et al. |
| 2008/0172518 A1 | 7/2008 | Shmulevich et al. |
| 2008/0172519 A1 | 7/2008 | Shmulevich et al. |
| 2008/0320209 A1 | 12/2008 | Lee et al. |
| 2011/0233648 A1 | 9/2011 | Seol et al. |
| 2011/0296088 A1 | 12/2011 | Dully et al. |

(Continued)

*Primary Examiner* — Duc Doan
(74) *Attorney, Agent, or Firm* — Volentine, Whitt & Francos, PLLC

(57) ABSTRACT

An operation method of a storage device, which is connected to a host through an interface sharing a memory buffer of the host, includes receiving an access command from the host, anticipating data that is expected to be requested by the host with reference to the access command, reading out the anticipated data from a nonvolatile memory device and loading the read data to a first area of the memory buffer, and in a case of being requested to load the anticipated data into a second area of the memory buffer by the host, moving the anticipated data from the first area to the second area.

20 Claims, 17 Drawing Sheets

(56) References Cited

U.S. PATENT DOCUMENTS

| | | |
|---|---|---|
| 2013/0086311 A1 | 4/2013 | Huang et al. |
| 2014/0013047 A1 | 1/2014 | Sawin et al. |
| 2014/0101386 A1 | 4/2014 | Jung et al. |
| 2015/0033005 A1 | 1/2015 | Surapuram |
| 2015/0046634 A1 | 2/2015 | Maeda et al. |
| 2015/0074334 A1 | 3/2015 | Kondo et al. |
| 2016/0062669 A1* | 3/2016 | Chu ..................... G06F 3/0611 711/103 |

* cited by examiner

STORAGE DEVICE AND METHOD OF OPERATING THE SAME

CROSS-REFERENCE TO RELATED APPLICATIONS

This U.S. non-provisional patent application claims priority under 35 U.S.C. §119 of Korean Patent Application No. 10-2015-0156933, filed on Nov. 9, 2015, the entire contents of which are hereby incorporated by reference.

BACKGROUND

The disclosure relates to semiconductor memory devices, and more particularly, to a storage device and a method of operating the same.

A flash memory device is widely used as an audio and image data storage medium of information devices such as a computer, a PDA, a digital camera, a camcorder, a voice recorder, an MP3 player, a handled PC. However, an erase operation has to precede and write operation of data in a flash memory and there is a characteristic that a unit of data being erased is greater than a unit of data being written. In a case where a flash memory is used as an auxiliary memory device, this characteristic may become a factor that impedes a use of a file system for a general hard disk. This characteristic implies that a sequential input/output processing of a flash memory is more effective than a non-sequential input/output processing.

An SSD (solid state drive) is a typical example of a large capacity storage device based on a flash memory. With a huge increase in demand, a use for an SSD is variously divided. For example, a use for an SSD may be subdivided into an SSD for a server, an SSD for a client, an SSD for a data center, etc. An interface of an SSD has to provide an optimum speed and optimum reliability according to each kind of use. To satisfy these kinds of requirements, an SATA, a PCIe, an SAS, etc. are applied as an optimum SSD interface. A PCIe-based NVMe and a UFS-based UME (unified memory extension) are being actively studied and is being applied to storage devices these days. These interfaces provide a memory sharing function between devices. Thus, a data management method of storage using a sharing method of this memory resource has become desirable.

SUMMARY

Embodiments of the disclosure provide an operation method of a storage device connected to a host through an interface sharing a memory buffer of the host. The operation method includes receiving an access command from the host, anticipating data expected to be requested by the host with reference to the access command, reading out the anticipated data from a nonvolatile memory device to load the read data to a first area of the memory buffer, and in a case of being requested to load the anticipated data into a second area of the memory buffer from the host, moving the anticipated data from the first area to the second area.

Embodiments of the disclosure also provide a storage device connected to a host through an interface sharing a memory buffer of the host. The storage device includes a plurality of nonvolatile memory devices, an internal buffer for buffering data being exchanged with the host, and a storage controller that anticipates data expected to be subsequently requested by the host with reference to an access command from the host and reads out the anticipated data from the nonvolatile memory devices or the internal buffer to load the read data into a source area of the memory buffer.

Embodiments of the disclosure also provide a storage device that buffers data within a memory buffer of an external host. The storage device includes a nonvolatile memory and a memory controller. The memory controller receives, from the host, a request to access the nonvolatile memory, identifies data that is anticipated to be subsequently requested by the host based upon the received access request, reads the anticipated data from the nonvolatile memory, and writes the anticipated data into a first area of the memory buffer.

BRIEF DESCRIPTION OF THE FIGURES

Embodiments of the disclosure will be described below in more detail with reference to the accompanying drawings. The embodiments of the disclosure may, however, be embodied in different forms and should not be construed as limited to the embodiments set forth herein. Rather, these embodiments are provided so that this disclosure will be thorough and complete and will fully convey the scope of the disclosure to those skilled in the art. Like numbers refer to like elements throughout.

DETAILED DESCRIPTION

Figure 1:
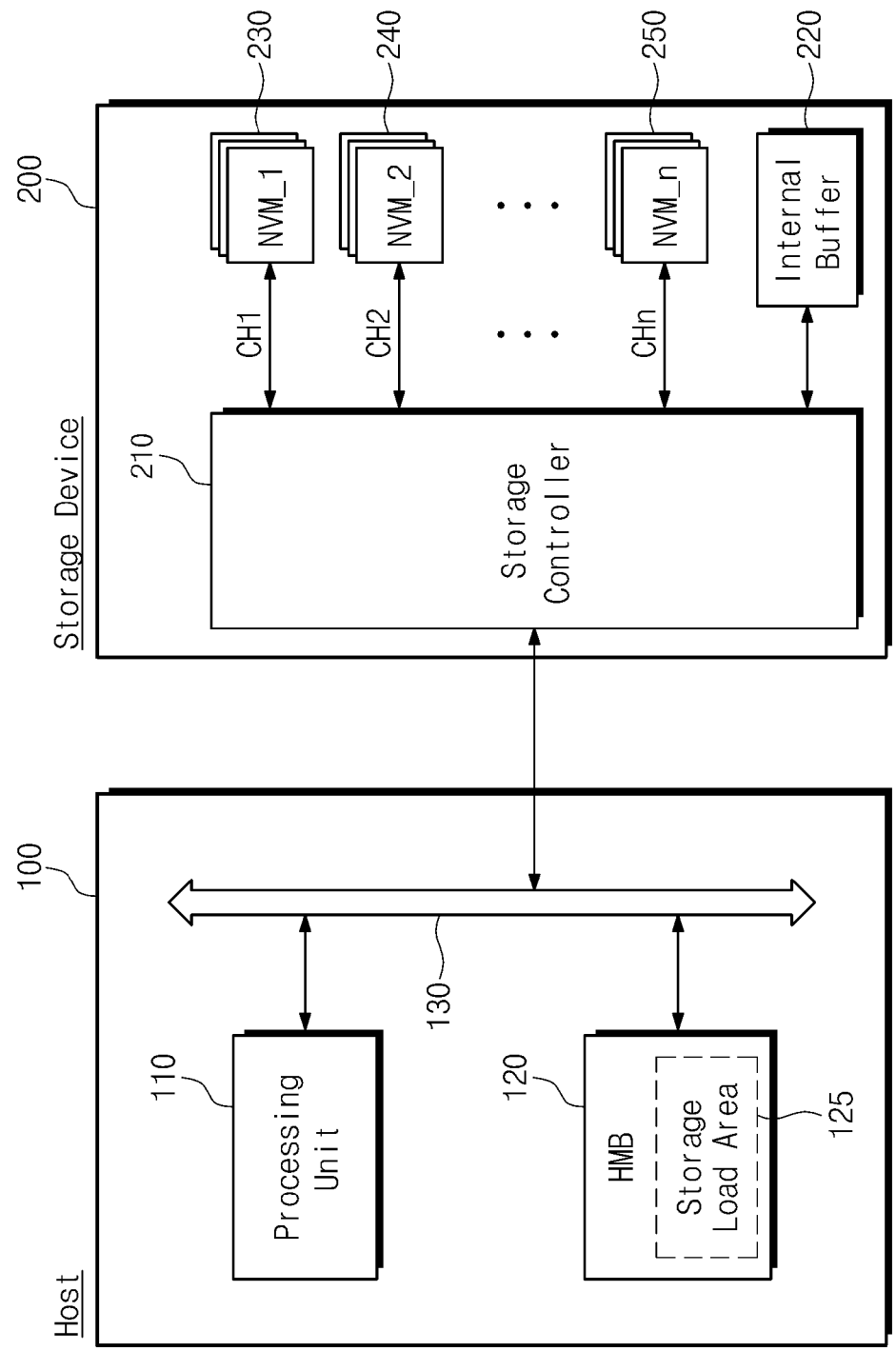
FIG. 1 is a block diagram illustrating a user device in accordance with some embodiments of the disclosure.

Embodiments of the disclosure will be described more fully hereinafter with reference to the accompanying drawings, in which embodiments of the disclosure are shown. This disclosure may, however, be embodied in many different forms and should not be construed as limited to the embodiments set forth herein. Rather, these embodiments are provided so that this disclosure will be thorough and complete, and will fully convey the scope of the disclosure to those skilled in the art. In the drawings, the size and relative sizes of layers and regions may be exaggerated for clarity. Like numbers refer to like elements throughout.

FIG. 1 is a block diagram illustrating a user device in accordance with some embodiments of the disclosure. Referring to FIG. 1, a user device includes a host 100 and a storage device 200. The host 100 accesses the storage device 200 to read out data requested from a client. The storage device 200, without interference from the host 100, can anticipate data that will be requested by the host 100 and load the anticipated data into a host memory buffer 120 of the host 100.

The host 100 writes data in the storage device 200 or reads data stored in the storage device 200. The host 100 provides a command/address to write data in the storage device 200. The host 100 may provide a variety of additional information to the storage device 200 besides the command/address. The host 100 includes the host memory buffer 120 that loads data anticipated by the storage device 200. Data not yet requested by the host 100 may be loaded into the host memory buffer 120 by the storage device 200.

The host 100 may include a processing unit 110, a host memory buffer 120, and an interface circuit 130. An application program, a file system, a device driver, etc. may be loaded into the host memory buffer 120. In addition, various software or data being driven in the host 100 may be loaded into the host memory buffer 120.

The processing unit 110 executes various software (e.g., an application program, an operating system, a device driver) loaded into the host memory buffer 120. The processing unit 110 can execute an OS (operating system) and an application program. The processing unit 110 may be provided as a homogeneous multi-core processor or a heterogeneous multi-core processor.

An application program or data to be processed in the processing unit 110 may be loaded into the host memory buffer 120. The host memory buffer 120 may include a storage load area 125 for supporting an anticipatory load operation led by the storage device 200.

The interface circuit 130 provides a physical connection between the host 100 and the storage device 200. That is, the interface circuit 130 transforms a command, an address, data, etc. corresponding to various access requests generated by the host 100 into an interfacing method with the storage device 200. A protocol of the interface circuit 130 may be at least one of a USB (universal serial bus) protocol, an SCSI (small computer system interface) protocol, a PCI-E (PCI-express) protocol, an ATA (advanced technology attachment) protocol, a parallel ATA protocol, a serial ATA protocol, an SAS (serial attached SCSI) protocol, and a UFS (universal flash storage) protocol. However, the interface circuit 130 may desirably provide an interfacing method in which the host memory buffer 120 can support a buffer function of the storage device 200. That is, the interface circuit 130 may provide an interfacing method for sharing memory resources of the host 100 and memory resources of the storage device 200. For example, the host 100 can manage the host memory buffer 120 and an internal buffer of the storage device 200 with a memory map. The host 100 may access the internal buffer, not with a block access method, but with a byte access method like the host memory buffer 120.

The storage device 200 may access nonvolatile memory devices 230, 240 and 250 in response to a command CMD being provided from the host 100 or may perform various operations requested by the host 100. The storage device 200 may perform an anticipatory load operation on the host memory buffer 120 with reference to a command/address or various additional information being provided from the host 100. The storage device 200 may perform an anticipatory load operation on the host memory buffer 120 with reference to a logical address and internal setting information from the host 100. The anticipatory load operation is not an operation directed by the host 100, but a pre-fetch operation on the host memory buffer 120 performed by a judgment of the storage device 200.

To perform the anticipatory load operation described above, the storage device 200 may include a storage controller 210, an internal buffer 220, and a plurality of nonvolatile memory devices 230, 240 and 250.

The storage controller 210 provides an interface between the host 100 and the storage device 200. The storage controller 210 can perform an anticipatory load operation of loading data not requested by the host 100 into the host memory buffer 120 of the host 100. The storage controller 210 reads data anticipated to be requested by the host 100 later from the nonvolatile memory devices 230, 240 and 250 with reference to a command/address, additional information or an internal setting being provided from the host 100. Although not requested by the host 100, the storage controller 210 may load the read data into the host memory buffer 120. The reason why this function is possible is because the storage controller 210 can operate as a master with respect to the host memory buffer 120.

The anticipatory load operation performed by the storage controller 210 may be performed with reference to additional information (e.g., a name space, a command ID, a data tag, a task ID, a process ID) being provided from the host 100. The anticipatory load operation may be performed by anticipating data consecutive to data requested by the host 100 with reference to an interleaving sequence set in the storage device 200. In a case where a logical address from the host 100 is provided as a sequential address, the storage controller 210 anticipates sequential data expected to be requested by the host 100 later, on the basis of the logical address, and loads the data into the host memory buffer 120. A detailed operation of the storage controller 210 will be described later in further detail.

According to some embodiments of the disclosure, the storage device 200 can load data anticipated to be requested by the host 100 into the host memory buffer 120 in advance with reference to a command/address, additional information, internal setting information, etc. from the host 100.

Figure 2:
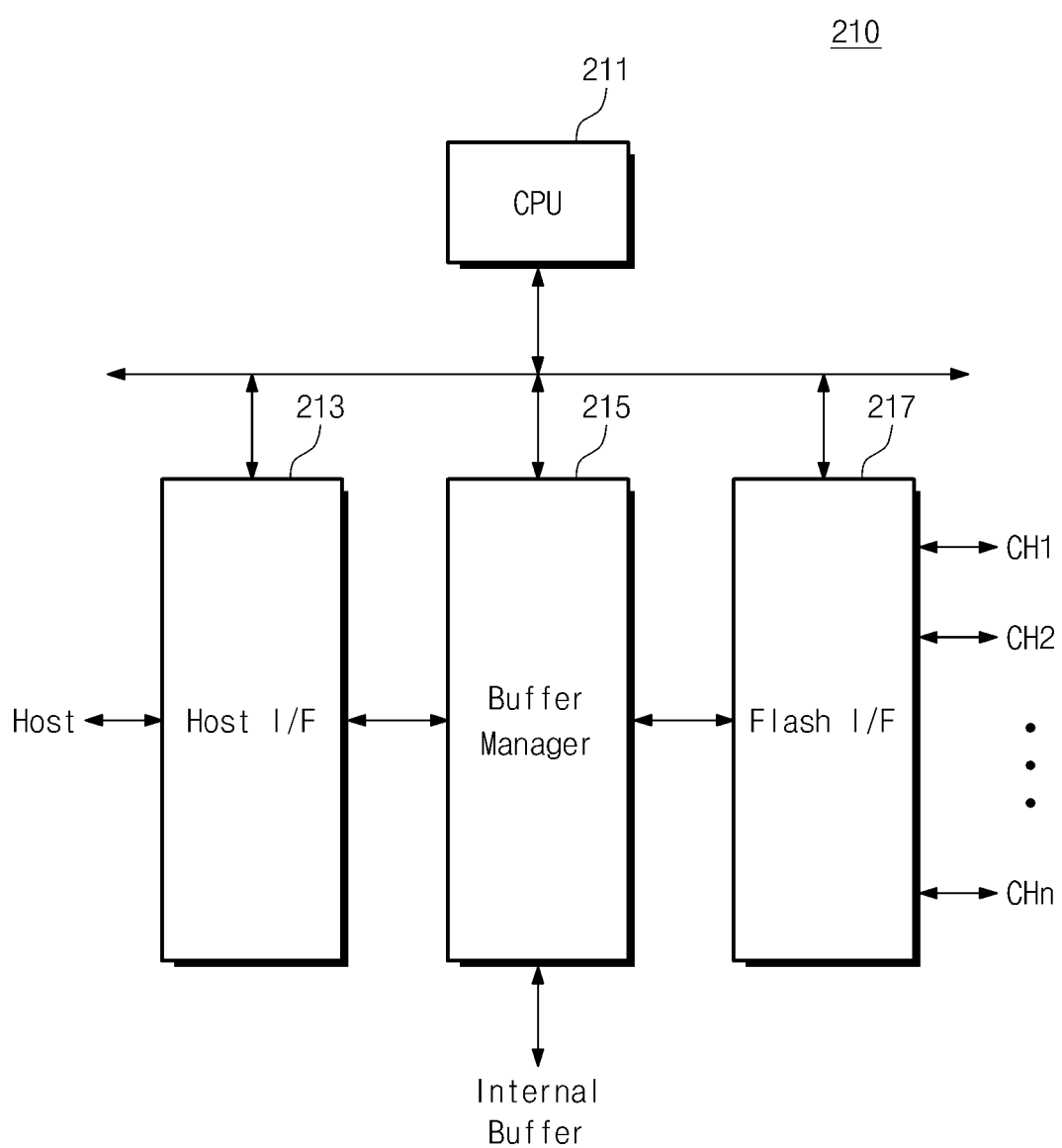
FIG. 2 is a block diagram illustrating a constitution of a storage controller of FIG. 1.

FIG. 2 is a block diagram illustrating a constitution of a storage controller of FIG. 1. Referring to FIG. 2, the storage controller 210 may include a CPU (central processing unit) 211, a host interface 213, a buffer manager 215, and a flash interface 217. The storage controller 210 can perform an anticipatory load operation on the host memory buffer 120 based on a command/address or additional information from the host 100 (refer to FIG. 1). The storage controller 210 can also perform an anticipatory load operation on the host memory buffer 120 with reference to a request from the host 100 and internal setting information of the storage device 200.

The CPU 211 transmits various control information, needed in a read/write operation with respect to the nonvolatile memory devices 230, 240 and 250, to registers of the host interface 213 and the flash interface 217. The CPU 211 may operate according to firmware provided for various control operations of the storage controller 210. For example, the CPU 211 can execute a garbage collection for managing the nonvolatile memory devices 230, 240 and 250 or a FTL (flash transform layer) for performing an address mapping, a wear leveling, etc.

The CPU 211 can execute an algorithm for performing an anticipatory load operation on the host memory buffer 120. The algorithm for performing an anticipatory load operation may be stored in a ROM included in the storage device 200 or the nonvolatile memory devices 230, 240 and 250. When being booted, the algorithm for performing an anticipatory load operation is loaded into the internal buffer 220 and is executed by the CPU 211.

The host interface 213 can perform a communication with the host 100. For example, the host interface 213 provides a communication channel with the host 100. The host interface 213 provides a protocol that can perform an anticipatory load operation by the storage device 200. The host interface 213 provides a physical connection between the host 100 and the storage device 200. That is, the host interface 213 provides an interface with the storage device 200 in response to a bus format of the host 100. The bus format of the host 100 may be constituted by at least one of a USB (universal serial bus) protocol, an SCSI (small computer system interface) protocol, a PCI-E (PCI-express) protocol, an ATA (advanced technology attachment) protocol, a parallel ATA protocol, a serial ATA protocol, an SAS (serial attached SCSI) protocol, and a UFS (universal flash storage) protocol.

The buffer manager 215 controls read and write operations of the internal buffer 220 (refer to FIG. 1). For example, the buffer manager 215 temporarily stores write data or read data in the internal buffer 220.

The flash interface 217 exchanges data with the flash memory devices 230, 240 and 250. The flash interface 217 writes data transmitted from the internal buffer 220 in the flash memory devices 230, 240 and 250 via respective memory channels CH1, CH2, . . . , CHn. Read data from the nonvolatile memory devices 230, 240 and 250 being provided through the memory channels CH1, CH2, . . . , CHn is collected by the flash interface 217. The collected read data is stored in the internal buffer 220.

Through the structure described above, the storage controller 210 can anticipate data which the host 100 will request later in response to a data request of the host 100. The storage controller 210 can load the anticipated data into the host memory buffer 120 of the host 100. In addition, if data loaded into the host memory buffer 120 by an anticipatory load operation is requested from the host 100, the storage controller 210 can move the loaded data to a position requested by the host 100 using various ways.

Figure 3:
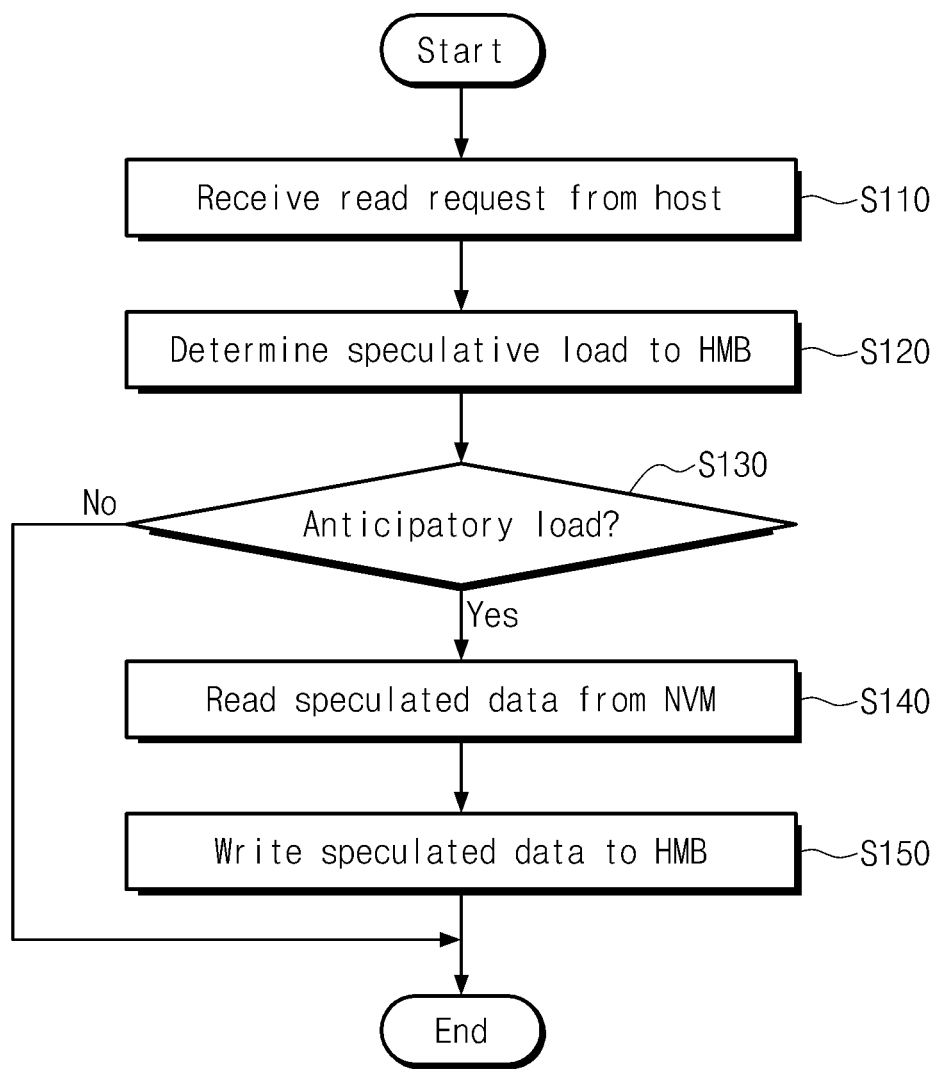
FIG. 3 is a flowchart illustrating an anticipatory load operation performed by a storage device of the disclosure.

FIG. 3 is a flowchart illustrating an anticipatory load operation performed by a storage device of the disclosure. Referring to FIG. 3, if receiving a read request from the host 100, the storage device 200 anticipates data which the host 100 will request and loads the anticipated data into the host memory buffer 120 of the host 100.

In an operation S110, the storage device 200 receives a read request from the host 100. The host 100 may provide a command/address for reading data stored in the nonvolatile memory devices 230, 240 and 250 to the storage device 200. Also, the host 100 can add a namespace, a data tag, a task ID, a process ID, etc. to a packet transmitting a command/address to deliver them according to an interface protocol of the host 100. Those things are called additional information.

In an operation S120, the storage device 200 reads out data requested by the host 100 from the nonvolatile memory devices 230, 240 and 250 to transmit the read data to the host 100. The storage device also determines whether to perform an anticipatory load operation separately from the readout operation requested by the host 100. For example, the storage device 200 determines whether to load data which the host 100 will request later into the host memory buffer 120 with reference to a command/address provided by the host 100. That is, the storage device 200 can determine whether to execute an anticipatory load operation by judging whether the data read-requested by the host 100 has a sequential pattern or a random pattern. In a case where a logical address of data requested by the host 100 is a random pattern, the storage device 200 may not perform an anticipatory load operation. In a case where a logical address of data requested by the host 100 is a sequential pattern, the storage device 200 may load data of a logical address, consecutive to a currently requested logical address, into the host memory buffer 120.

It may be determined whether an anticipatory load operation is executed with reference to not only a data pattern but also whether data corresponding to a specific logical address is hot data frequently updated. The storage device 200 may also determine whether to execute an anticipatory load operation with reference to additional information transmitted by the host 100. That is, the storage device 200 may also determine whether to execute an anticipatory load operation with reference to additional information (e.g., a namespace, a data tag, a task ID, a process ID, etc.) included in a command provided when a read operation is requested from the host 100. The additional information is accumulated in a table form or a data base form and an anticipatory load operation may be applied to a command having a specific task, a specific process and a specific data tag based on the accumulated information. It may be determined whether an anticipatory load operation is executed with reference to an internal setting of the storage device 200, for example, an interleaving sequence executed with respect to the nonvolatile memory devices 230, 240 and 250.

In an operation S130, an operation branches off according to whether to apply an anticipatory load operation. If an application of an anticipatory load operation is determined (Yes direction), the procedure goes to an operation S140. If it is determined that an application of an anticipatory load operation is not necessary (No direction), an anticipatory load operation with respect to a currently received read request is finished.

In the operation S140, a read with respect to anticipated data for an anticipatory load operation is performed. For example, the storage device 200 reads out data anticipated to be requested consecutive to the read-requested data in the operation S110 from the nonvolatile memory devices 230, 240 and 250. It is described that data being read out for an anticipatory load operation is data stored in the nonvolatile memory devices 230, 240 and 250. However, the disclosure is not limited thereto. Data which becomes a target of an anticipatory load operation may be data cached not only in the nonvolatile memory devices 230, 240 and 250 but also in the internal buffer 220.

In an operation S150, the storage device 200 stores data read out for an anticipatory load operation in the storage load area 125 of the host memory buffer 120. At this time, in an interface protocol level, the storage device 200 has a master authority with respect to the host memory buffer 120 to write data.

Procedures of an anticipatory load operation were described above. To execute an anticipatory load operation, the storage device 200 may refer to a command/address or a variety of additional information being provided from the host 100. As will be described later, after an anticipatory load operation is completed, the storage device 200, in a case where the host 100 requests data loaded into the host memory buffer 120 by the anticipatory load operation, can perform an address transform or a data movement. Thus, the host 100 can access the anticipatorily loaded data in the host memory buffer 120.

Figure 4:
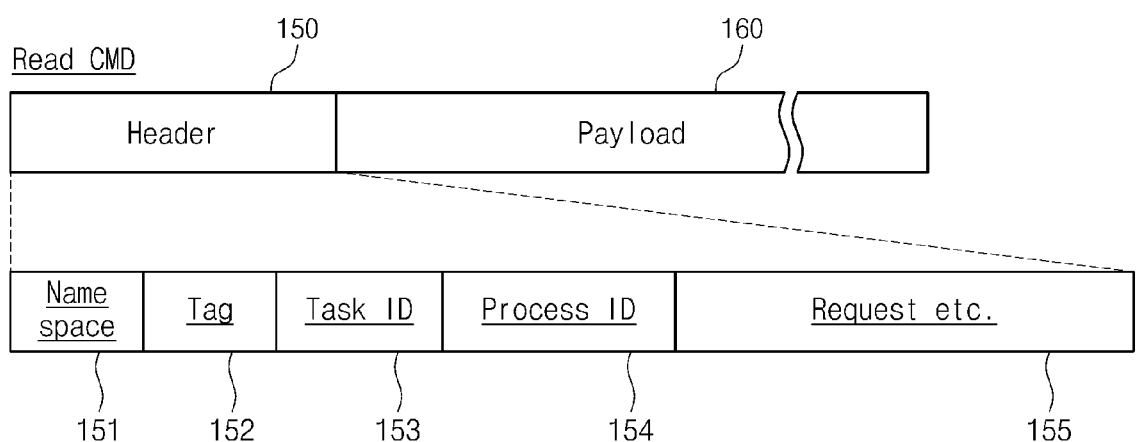
FIG. 4 is a drawing illustrating additional information for determining whether to apply an anticipatory load operation.

FIG. 4 is a drawing illustrating additional information for determining whether to apply an anticipatory load operation. Referring to FIG. 4, the host 100 can provide a read request to the storage device 200 in a packet form. Additional information may be included in a header 150 of the packet. Alternatively, the additional information may be included in a pay load 160.

The host 100 may constitute a packet in a transaction layer to transmit a read command to the storage device 200. The header 150 of the packet may include a variety of control information. The header 150 may also include additional information 151, 152, 153, 154 and 155 for determining whether to apply an anticipatory load operation of the disclosure. The name space 151 may represent the subject that issues a request of a read command in an interface. For example, the name space 151 may be any one of a plurality of processing units or may direct an interrupt controller and a GPU. The data tag 152 may include tag information given by the host 100 to manage requested data. The task ID 153 may include task information being executed in the host 100 that issues a read request. The process ID 154 may include identification information of a process of the host 100 that issues a read command. Besides, a variety of additional information 155 of the host 100 that issued a read command may be added.

If an anticipatory load operation is executed in a specific task, a specific process, or a thread with reference to the additional information 151, 152, 153, 154 and 155, described above, system efficiency may be improved.

Figure 5:
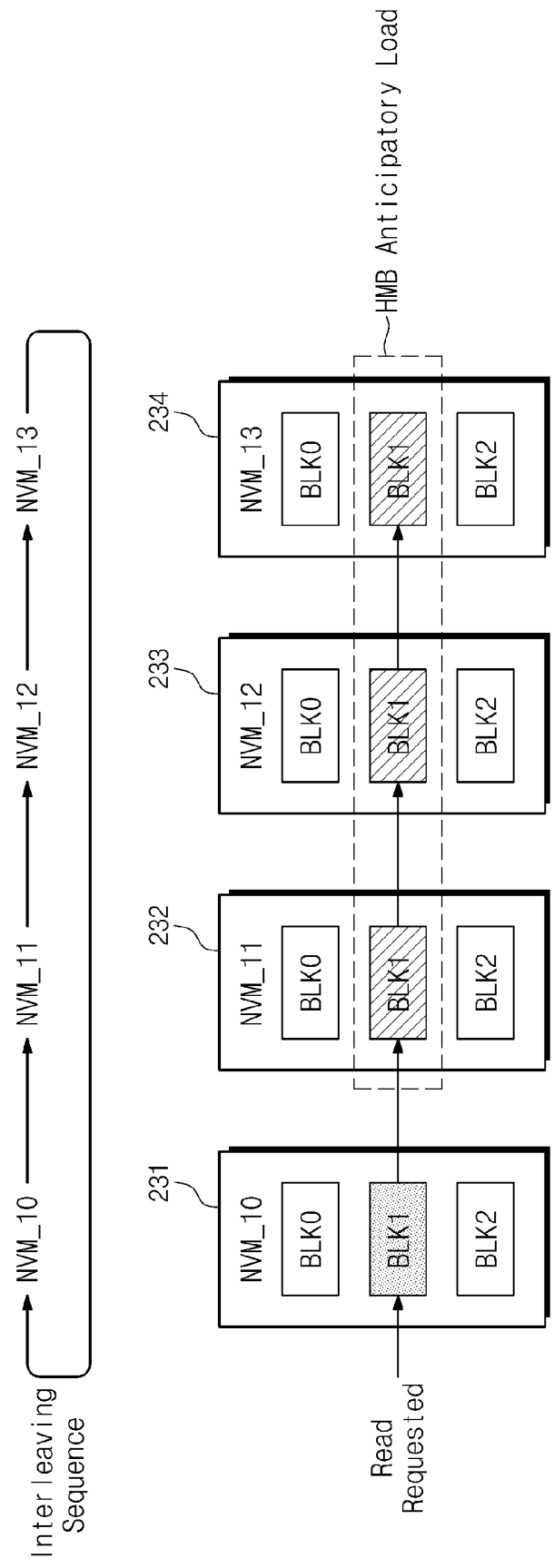
FIG. 5 is a drawing illustrating an example of an internal setting of a storage device for judging whether to apply an anticipatory load operation.

FIG. 5 is a drawing illustrating an example of an internal setting of a storage device for judging whether to apply an anticipatory load operation. Referring to FIG. 5, an interleaving order of nonvolatile memory devices 231, 232, 233, and 234 connected to any one channel is illustrated.

It is assumed that a selection order of the nonvolatile memory devices 231, 232, 233, and 234 for an interleaving is a loop of (NVM10→NVM11→NVM12→NVM13→NVM10→ . . . ). In a case where data read-requested from the host 100 is a memory block BLK1 of the nonvolatile memory device (231, NVM_10), data anticipated to be requested later may be data corresponding to the memory block BLK1 of each of the nonvolatile memory devices 231, 232, 233, and 234. Thus, the storage device 200 can load data stored in the memory block BLK1 of each of the nonvolatile memory devices 231, 232, 233, and 234 into the host memory buffer 120. The anticipatory load operation may be applied only when a read-requested data pattern is a sequential pattern.

Figure 6:
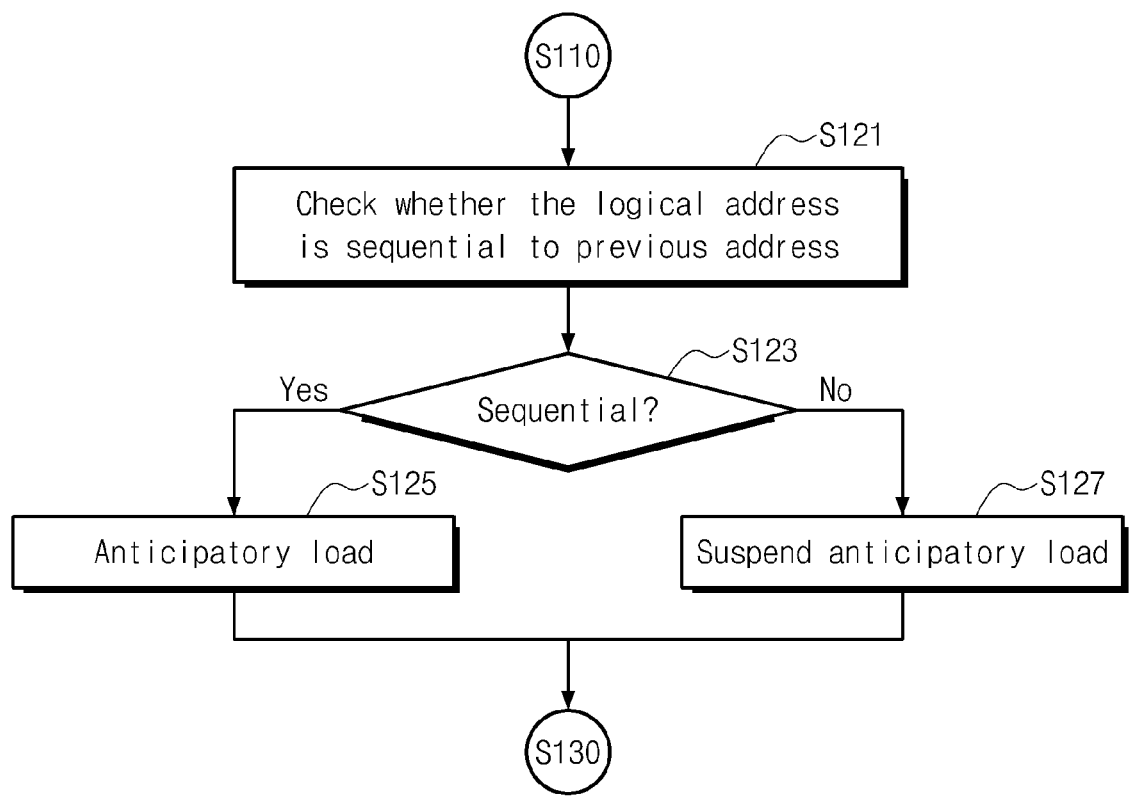
FIG. 6 is a flowchart illustrating another example of determining whether to apply an anticipatory load operation.

FIG. 6 is a flowchart illustrating another example of determining whether to apply an anticipatory load operation. Referring to FIG. 6, if a read request is provided from the host 100, the storage device 200 executes a procedure of judging a pattern of a read request for determining whether to apply an anticipatory load operation.

In an operation S121, the storage device 200 checks whether a read-requested logical address is consecutive to a logical address of data read-requested before. If it is determined that a logical address of currently read-requested data is consecutive to a logical address of previously read-requested data, a data pattern may be judged as a sequential pattern. If it is determined that a logical address of currently read-requested data is nonconsecutive to a logical address of previously read-requested data, a data pattern may be judged as a random pattern.

In an operation S123, an operation branches off according to a pattern of read-requested data. If a pattern of data is determined to be sequential (Yes direction), the procedure goes to an operation S125. If a pattern of data is determined to be not sequential but random (No direction), the procedure goes to an operation S127.

In the operation S125, the storage device 200 reads out data having a logical address consecutive to a current logical address from the nonvolatile memory devices 230, 240 and 250 to execute an anticipatory load operation by writing the data in the host memory buffer 120.

In an operation S127, the storage device 200 determines a suspension of an anticipatory load operation. The procedure goes to an operation S130.

There was described an example where a pattern of read-requested data is judged based on a logical pattern and it is determined whether an anticipatory load operation is executed according to the judged pattern of the data.

Figure 7:
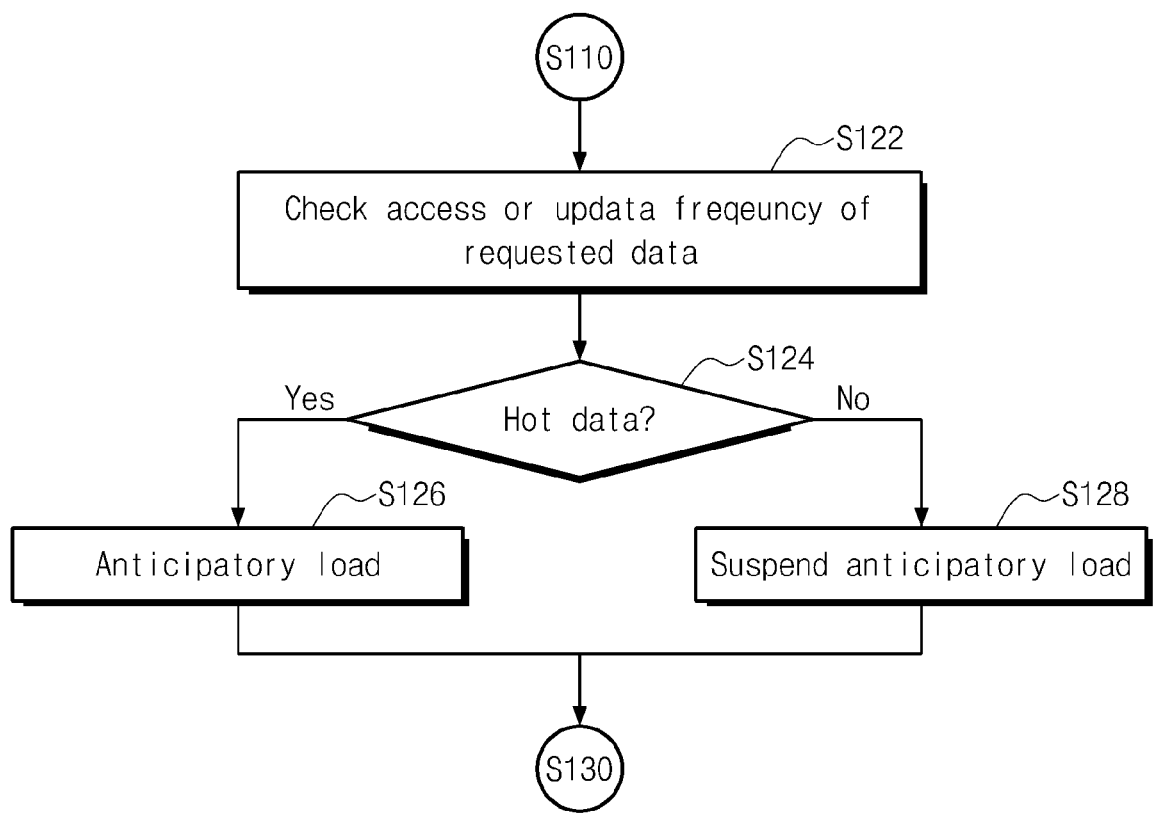
FIG. 7 is a flowchart illustrating still another example of determining whether to apply an anticipatory load operation.

FIG. 7 is a flowchart illustrating still another example of determining whether to apply an anticipatory load operation. Referring to FIG. 7, if a read request is provided from the host 100, the storage device 200 executes a procedure of judging a property (Hot, Cold) of data for determining whether to apply an anticipatory load operation.

In an operation S122, the storage device 200 performs an operation for judging a property of access-requested data. For example, the storage device 200 can judge whether read-requested data from the host 100 is data for which more than a specific number of access requests occurs during a reference time. That is, in a case where data corresponding to the same logical address is updated or read-requested more than a specific number of times, the data may be designated as hot data. In a case where the number of accesses of data currently requested from the host 100 is smaller than a specific number within the reference time or a logical address of the data currently requested from the host 100 does not have the same logical address as data access-requested before, the data may be designated as cold data. Here, hot data and cold data were described as an example of a property of data, but this particular property is only illustrative. That is, a judgment on various data properties may be performed and it may be determined whether an anticipatory load operation is executed according to the judgment.

In an operation S124, an operation branches off according to a judgment result of a data property. If the data property detected in the operation S122 is hot data, the procedure goes to an operation S126. If the data property detected in the operation S122 is cold data, the procedure goes to an operation S128.

In the operation S126, the storage device 200 executes an anticipatory load operation for moving most-recently updated data corresponding to a current read-requested logical address from the nonvolatile memory devices 230, 240 and 250 or the internal buffer 220 to the host memory buffer 120. In a case where the host 100 requests data loaded into the host memory buffer 120 after execution of an anticipatory load operation is completed, the storage device 200 can rapidly provide requested data by performing a data movement in the host memory buffer 120 or an address transformation.

In the operation S128, the storage device 200 determines a suspension of an anticipatory load operation. This is, the anticipatory load operation is not performed because the host 100 is less likely to access cold data. Subsequently, the procedure goes to the operation S130 of FIG. 3.

A method of judging whether an anticipatory load operation is executed with reference to the property of access-requested data. Depending on whether the property of access-requested data is hot data or cold data, it is determined whether an anticipatory load operation is executed. However, the property of data is not limited to the hot data and the cold data. It may be determined whether an anticipatory load operation is executed with reference to various properties of data.

Figure 8:
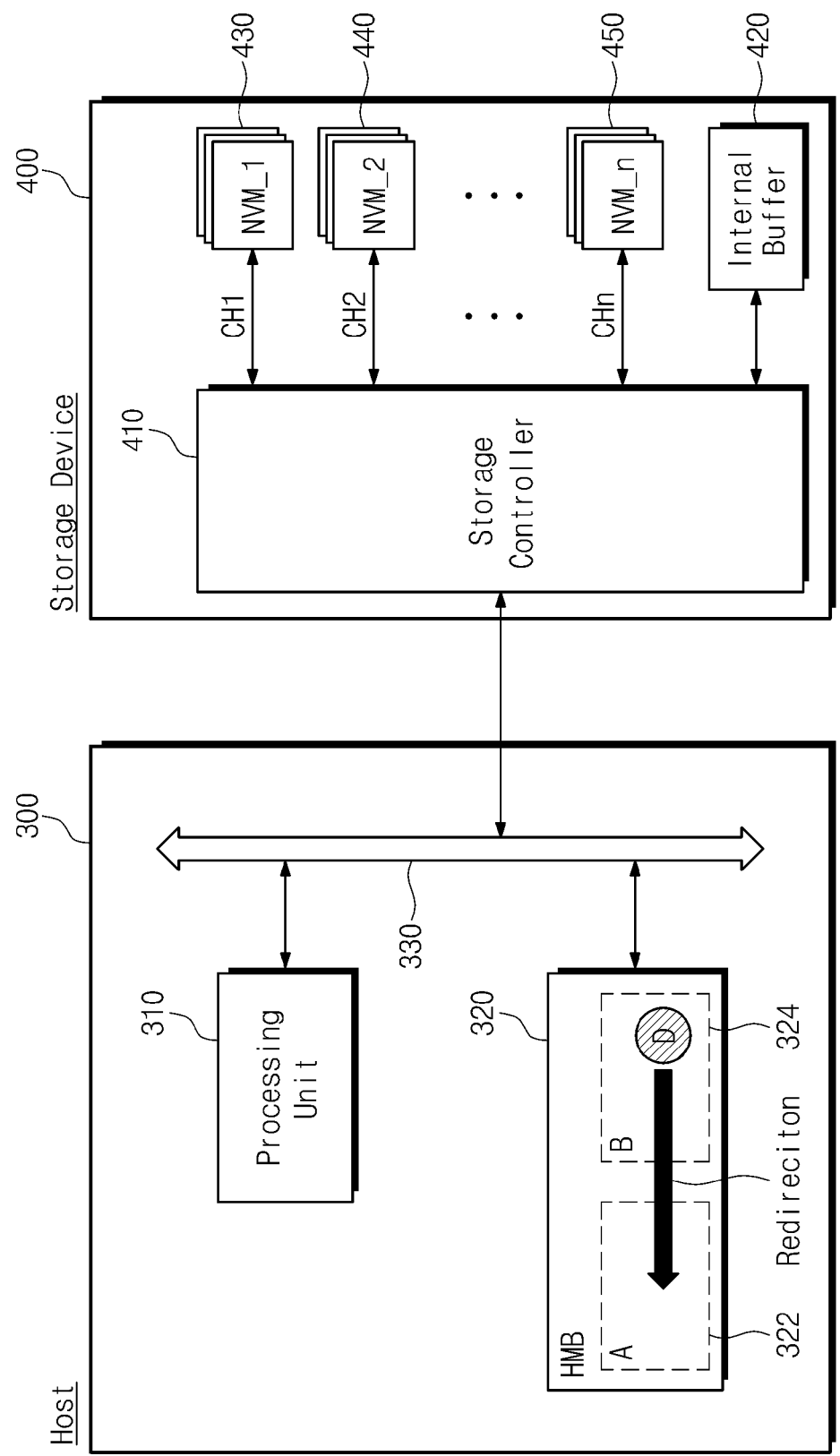
FIG. 8 is a block diagram illustrating a user device in accordance with some other embodiments of the disclosure.

FIG. 8 is a block diagram illustrating a user device in accordance with some other embodiments of the disclosure. Referring to FIG. 8, a user device includes a host 300 and a storage device 400. The host 300 includes a host memory buffer 320 into which data is loaded according to an anticipatory load operation of the storage device 400. A case may occur in which the host 300 requests the host memory buffer 320 for anticipatorily loaded data. The storage device 400 may inform the host 300 that the requested data is stored in the host memory buffer 320 or may move the data to a buffer area designated by the host 300. Here, a processing unit 310, nonvolatile memory devices 430, 440 and 450, and an internal buffer 420 may be substantially the same as the processing unit 110, the nonvolatile memory devices 230, 240 and 250, and the internal buffer 220 described in FIG. 1. Thus, a detailed description of an operation or function thereof will be omitted.

The host 300 requests the storage device 400 provide data for which a read request occurs. The host 300 transmits a command so that the requested data is stored in a first area 322 of the host memory buffer 320. Then, the storage device 400 reads out the data requested by the host 300 from the nonvolatile memory devices 430, 440 and 450 to write the data in the first area 322 of the host memory buffer 320. However, the data requested by the host 300 may already exist in a second area 322 of the host memory buffer 320 according to an anticipatory load operation. In this case, the storage device 400 may perform a movement or an address exchange of the requested data on the host memory buffer 320 in response to a read request of the host 300.

The storage device 400 can perform the anticipatory load operation described through FIGS. 1 through 7. If receiving a read request with respect to data D loaded into the second area 324 of the host memory buffer 320, the storage device 400 detects whether data requested before exists in the host memory buffer 320. If it is determined that the requested data corresponds to the data D loaded into the host memory buffer 320, a storage controller 410 can inform the host 300 of an address of the anticipatorily loaded data D or can directly move data. In addition, the storage controller 410 may change an address of the data D of the host memory buffer 320 to an address requested by the host 300. These operations will be described in detail later.

According to some embodiments of the disclosure, in a case where data requested by the host 300 exists in the host memory buffer 320, the storage device 400 can redirect data requested on the host memory buffer 320 in various ways. For example, if the storage device 400 transmits an address of anticipatorily loaded data to the host 300, the host 300 can move the data from the second area 324 to the first area 322. As another example, the storage device 400 can move the anticipatorily loaded data from the second area 324 to the first area 322. The storage device 400 can also change memory address information (e.g., physical region descriptor) of the host memory buffer 320.

Figure 9:
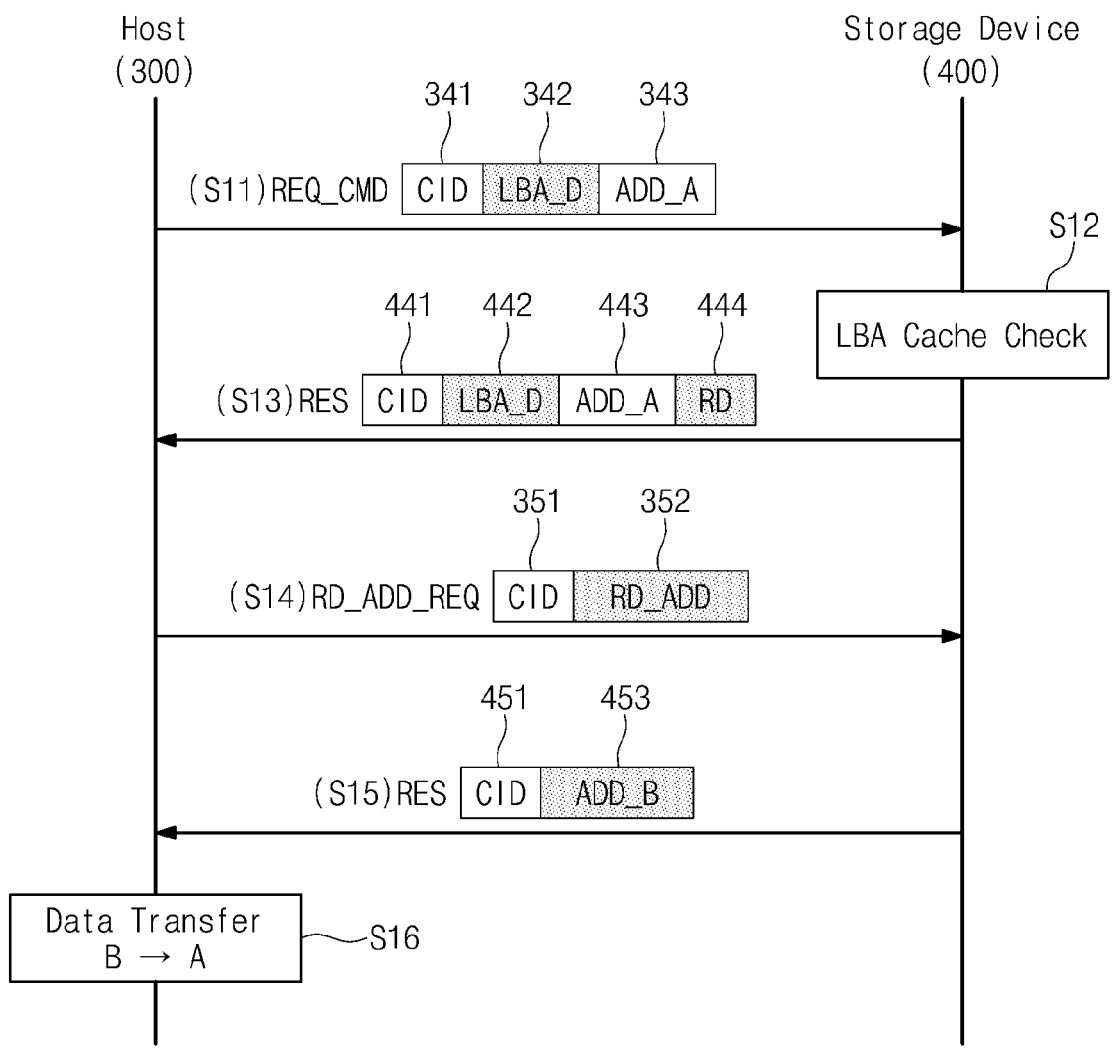
FIG. 9 is a drawing illustrating an example of an access request and a response relationship between a host and a storage device that are illustrated in FIG. 8.

FIG. 9 is a drawing illustrating an example of an access request and a response relationship between the host 300 and the storage device 400 that are illustrated in FIG. 8. Referring to FIG. 9, the host 300 requests the storage device 400 provide anticipatorily loaded data. Then, the storage device 400 provides address information of the anticipatorily loaded data to the host 300. The host 300 can move data loaded into the second area 324 of the host memory buffer 320 to the first area 322 with reference to the address provided by the storage device 400. It is assumed that anticipatorily loaded data is stored in the second area 324 of the host memory buffer 320 according to an anticipatory load operation of the storage device 400.

In an operation S11, the host 300 requests the storage device 400 to read out data D and to load the read data into the first area 322 of the host memory buffer 320. The host 300 can transmit a command CID 341, a source address 342, and a target address 343 using this command sequence REQ_CMD for a data request. The command CID 341 may be a read command or a write command prescribed by an interface protocol with the storage device 400. The source address 342 may be a logical address of data D which is requested from the storage device 400. The target address 343 is an address on the host memory buffer 320 into which data read from the source address 342 is to be loaded.

In an operation S12, the storage device 400 performs a cache check using a logical address LBA to determine whether data of the source address 342 provided by the host 300 coincides with the anticipatorily loaded data D. It is assumed, for the purpose of explanation here, that data D requested by the host 300 exists in the second area 324 of the host memory buffer 320 according to an anticipatory load operation (that is, cache hit).

In an operation S13, the storage device 400 communicates that data requested by the host 300 exists in the host memory buffer 320 and an address redirection is needed. For example, the storage device 400 can add a field corresponding to a redirection option 444 to a command sequence 441, 442 and 443 received from the host 300 to transmit a response signal RES to the host 300.

In an operation S14, the host 300 requests, through a command sequence RD_ADD_REQ, the storage device 400 to provide an address for a redirection. The host 300 can transmit a request command CID 351 and information RD_ADD 352 of the redirection address.

In an operation S15, the storage device 400 transmits an address ADD_B 453 of data D loaded into the second area 324 of the host memory buffer 320 to the host 300 according to an anticipatory load operation. The address ADD_B 453 may accompany a command CID 451 received from host 300 in a command sequence RES.

In an operation S16, the host 300 moves or copies anticipatorily loaded data D in the host memory buffer 320 from the second area 324 to the first area 322, which the host 300 requested as the target address 343.

If the host 300 requests the anticipatorily loaded data, the storage device 400 provides address information and the host 300 moves data with reference to the address information. Thus, if using this procedure, movement of the anticipatorily loaded data on a bus may be minimized.

Figure 10:
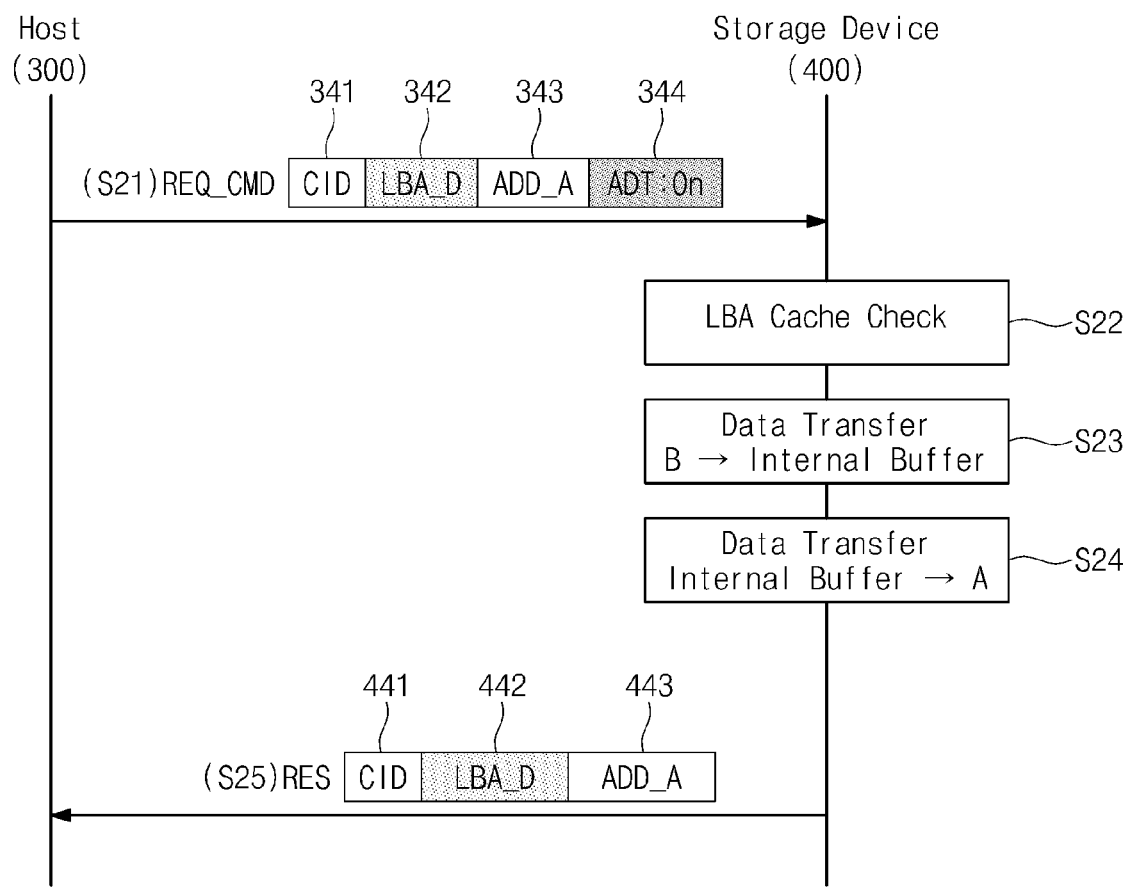
FIG. 10 is a drawing illustrating another example of an access request and a response relationship between a host and a storage device that are illustrated in FIG. 8.

FIG. 10 is a drawing illustrating another example of an access request and a response relationship between the host 300 and the storage device 400 that are illustrated in FIG. 8. Referring to FIG. 10, if receiving a request for anticipatorily loaded data from the host 300, the storage device 400 can move data of the second area 324 to the first area 322. It is assumed that anticipatorily loaded data D is stored in the second area 324 of the host memory buffer 320 and the host 300 requests the storage device 400 for the anticipatorily loaded data D.

In an operation S21, the host 300 requests the storage device 400 to read out data D and to load the read data into the first area 322 of the host memory buffer 320. The host 300 can transmit a command CID 341, a source address 342, and a target address 343 using this command sequence REQ_CMD for a data request. In addition, the host 300 may further include an option field 344 which directs the storage device 400 move anticipatorily loaded data D automatically to the target address 343 in a command. In the drawing, the option field is illustrated as a device automatic transmit field 344. The host 300 can activate the device automatic transmit field 344 to an on-state (ADT: On) and transmit the activated device automatic transmit field 344 to the storage device 400. The source address 342 may be a logical address of data D which is request from the storage device 400. The target address 343 is an address on the host memory buffer 320 into which data which is read from the source address 342 is to be loaded.

In an operation S22, the command CID 341 may be a read command or a write command prescribed by an interface protocol with the storage device 400. The source address 342 may be a logical address of data D which is requested from the storage device 400. The target address 343 is an address on the host memory buffer 320 into which data which is read from the source address 342 is to be loaded.

In an operation S22, the storage device 400 performs a cache check using a logical address LBA to determine whether data of the source address 342 provided by the host 300 coincides with the anticipatorily loaded data D. It is assumed, in this example, that data D requested by the host 300 exists in the second area 324 of the host memory buffer 320 (that is, cache hit).

In an operation S23, the storage device 400 begins a data transfer at a level of the storage device 400 with reference to a value of the device automatic transmit field 344 provided from the host 300. First, the storage device 400 fetches to the internal buffer 420 anticipatorily loaded data stored in the second area B 324 of the host memory buffer 320.

In an operation S24, the storage device 400 transmits the anticipatorily loaded data D transferred to the internal buffer 420 to the first area A 322 of the host memory buffer 320 corresponding to the target address 343 provided by the host 300.

In an operation S25, the storage device 400 informs the host 300 that data D requested by the host 300 is loaded into the first area 322 of the host memory buffer 320. A response sequence RES 441, 442 and 443 by the storage device 400 is not limited to the ways illustrated, and a signal or data representing that a request of the host 300 is completed may be fine.

If the host 300 requests anticipatorily loaded data, the storage device 400 can automatically transmit the anticipatorily loaded data to a target address of the host memory buffer 320 requested by the host 300. In this case, the host 300 can add an option field that directs an automatic transmission operation by the storage device 400 to a command communicated to the storage device 400.

Figure 11:
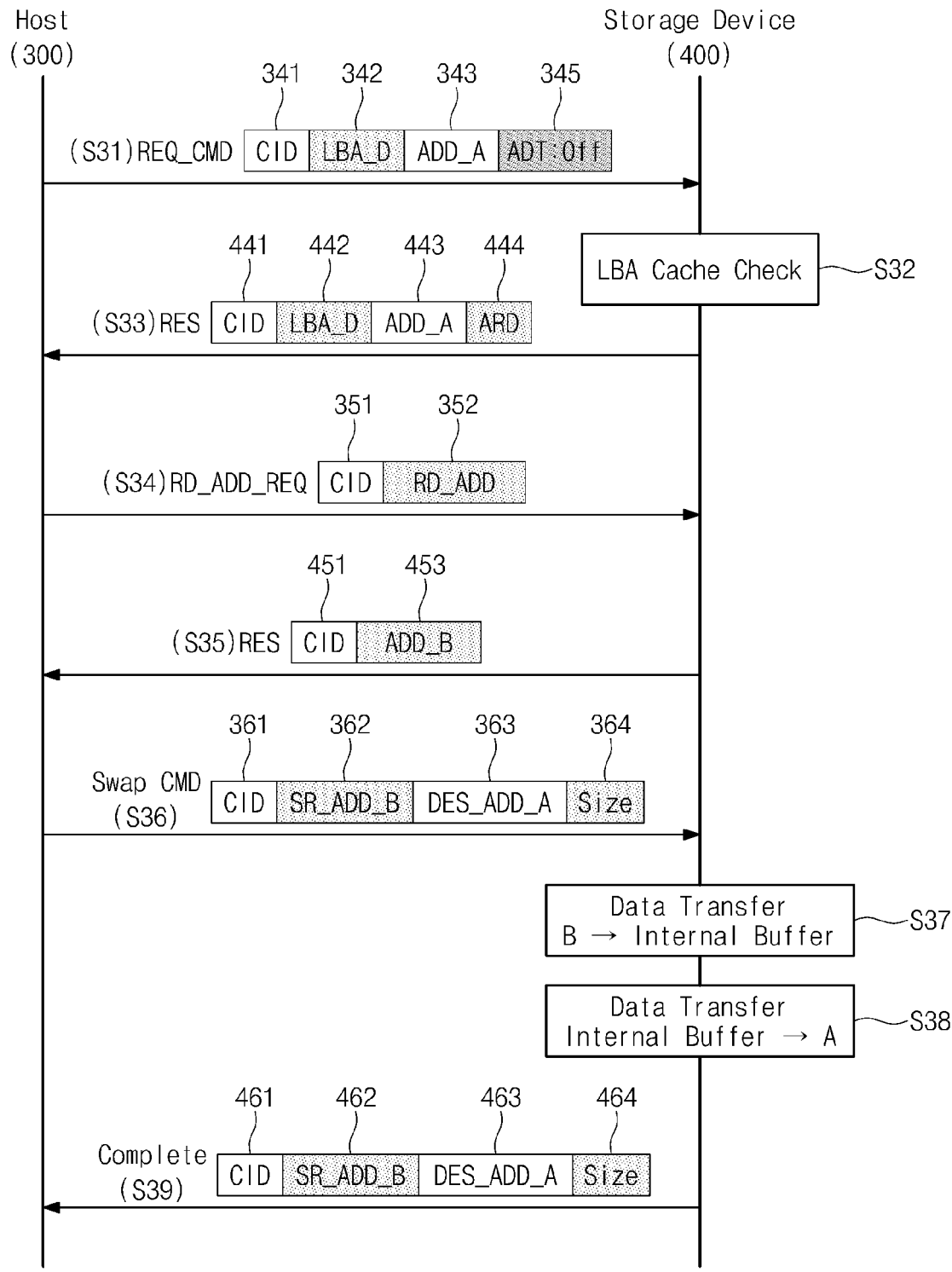
FIG. 11 is a drawing illustrating an example of a redirection with respect to anticipatorily loaded data between a host and a storage device that are illustrated in FIG. 8.

FIG. 11 is a drawing illustrating an example of a redirection with respect to anticipatorily loaded data between the host 300 and the storage device 400 that are illustrated in FIG. 8. Referring to FIG. 11, in response to an exchange command Swap CMD by the host 300, anticipatorily loaded data may be transferred from the second area 324 to the first area 322 by the storage device 400.

In an operation S31, the host 300 requests the storage device 400 to read out data D and to load the read data into the first area 322 of the host memory buffer 320. The host 300 can transmit a command CID 341, a source address 342, and a target address 343 using the command sequence REQ_CMD for a data request. In addition, it is assumed that a device automatic transmission field 345 is at an off-state ADT.

In an operation S32, the storage device 400 performs a cache check using a logical address LBA to determine whether data of the source address 342 provided by the host 300 coincides with the anticipatorily loaded data D. It is assumed, for this example, that data D requested by the host 300 exists in the second area 324 of the host memory buffer 320 according to an anticipatory load operation (that is, cache hit).

In an operation S33, the storage device 400 communicates that data requested by the host 300 exists in the host memory buffer 320 and an address redirection is needed. For example, the storage device 400 can add a field corresponding to a redirection option 444 to a command sequence 441, 442 and 443 received from the host 300 to transmit a response signal RES to the host 300.

In an operation S34, the host 300 requests the storage device 400 for an address for a redirection. The host 300 can transmit a request command 351 and information RD_ADD 352 of the redirection address in a command sequence RD_ADD_REQ.

In an operation S35, the storage device 400 transmits an address ADD_B 453 of data D loaded into the second area 324 of the host memory buffer 320 to the host 300 according to an anticipatory load operation. The address ADD_B 453 may accompany a command 451 within a command sequence RES.

In an operation S36, the host 300 can transfer a movement command Swap CMD on the host memory buffer 320 to the storage device 400 with reference to the address ADD_B 453. That is, the host 300 can transfer a movement command Swap CMD that provides information of a size 364 of anticipatorily loaded data from a source address 362 of the second area 324 to a target address 363 of the first area 322. This information may be communicated with a command 361 in the command sequence Swap CMD.

In an operation S37, the storage device 400 moves anticipatorily loaded data D stored in the second area B 324 of the host memory buffer 320 to the internal buffer 420 in response to the movement command Swap CMD.

In an operation S38, the storage device 400 transmits the anticipatorily loaded data from the internal buffer 420 to the first area A 322 of the host memory buffer 320 corresponding to the target address 363 provided by the host 300.

In an operation S39, the storage device 400 informs the host 300 that data D requested by the host 300 is loaded into the first area 322 of the host memory buffer 320. A response sequence Complete 461, 462, 463 and 464 by the storage device 400 is not limited to the illustrated way, and a signal or data representing that a request of the host 300 is completed may be fine.

An embodiment was described in which the storage device 400 provides address information to the host 300 and the host 300 transfers the movement command Swap CMD to the storage device 400 with reference to the provided address information of the speculative load data.

Figure 12:
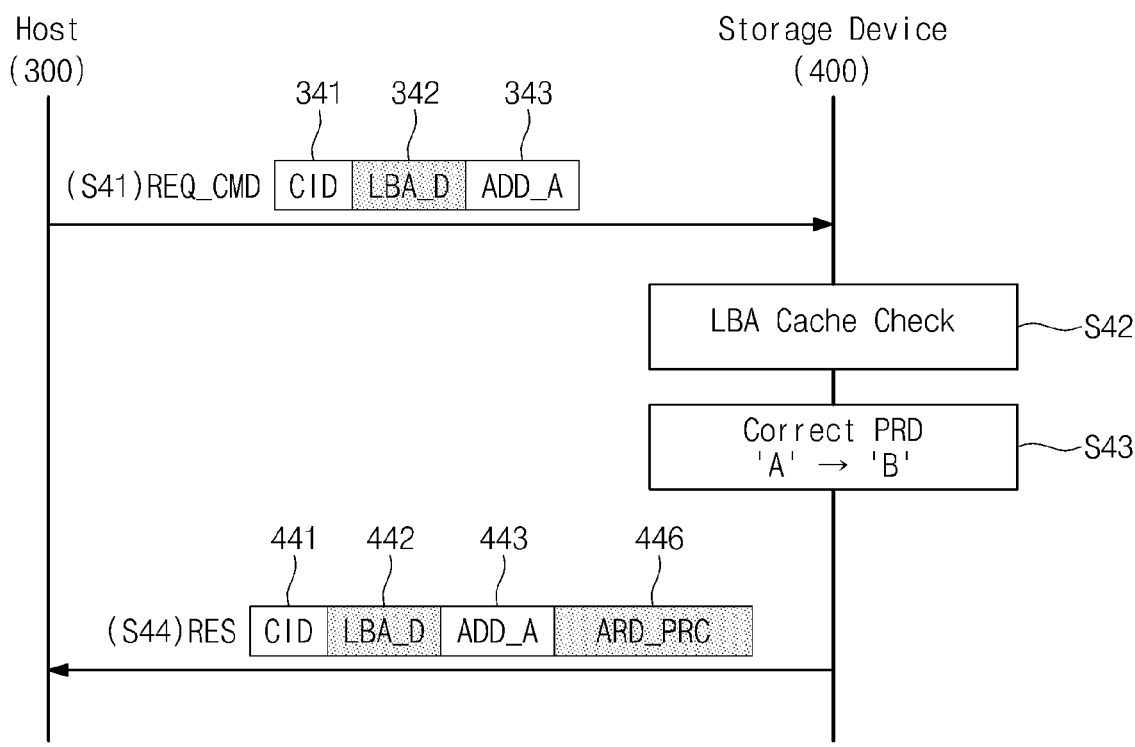
FIG. 12 is a drawing illustrating an example of a redirection that occurs between a host and a storage device that are illustrated in FIG. 8.

FIG. 12 is a drawing illustrating an example of a redirection that occurs between a host and a storage device that are illustrated in FIG. 8. Referring to FIG. 12, if anticipatorily loaded data is requested from the host 300, the storage device 400 can provide the anticipatorily loaded data through a correction of mapping information on the host memory buffer 320 without substantial movement of data.

In an operation S41, the host 300 requests the storage device 400 to read out data D and then load the read data into the first area 322. Since the data request is substantially the same as the request of FIG. 9 described before, a detailed description thereof is omitted.

In an operation S42, the storage device 400 performs a cache check using a logical address LBA to determine whether data of the source address 342 provided by the host 300 coincides with the anticipatorily loaded data D. It is assumed, in this example, that the data D requested by the host 300 exists in the second area 324 of the host memory buffer 320 (i.e., cache hit).

In an operation S43, the storage device 400 changes address mapping information of the host memory buffer 320 of the host 300. That is, the storage device 400 can change a first address value A to a second address value B in memory mapping information (e.g., physical region descriptor) of the host 300.

In an operation S44, the storage device 400 informs the host 300 that address information is changed for the host memory buffer 320 without data movement. To inform the change of the address information, the storage device 400 can transmit a response sequence RES 441, 442, 443 and 446 to the host 300. The response field 446 is information that informs the host 300 that a redirection with respect to requested data on the host memory buffer 320 is completed. With reference to the response sequence 441, 442, 443 and 446, the host 300 recognizes that the requested data is located at a target region of the host memory buffer 320.

The request of the host 300 for anticipatorily loaded data and examples of the consequential redirection operations of the storage device 400 were described through FIGS. 9 through 12. The redirection operations performed by the storage device 400 were not limited to the examples described above. Various examples of the redirection operation may be applied.

Figure 13:
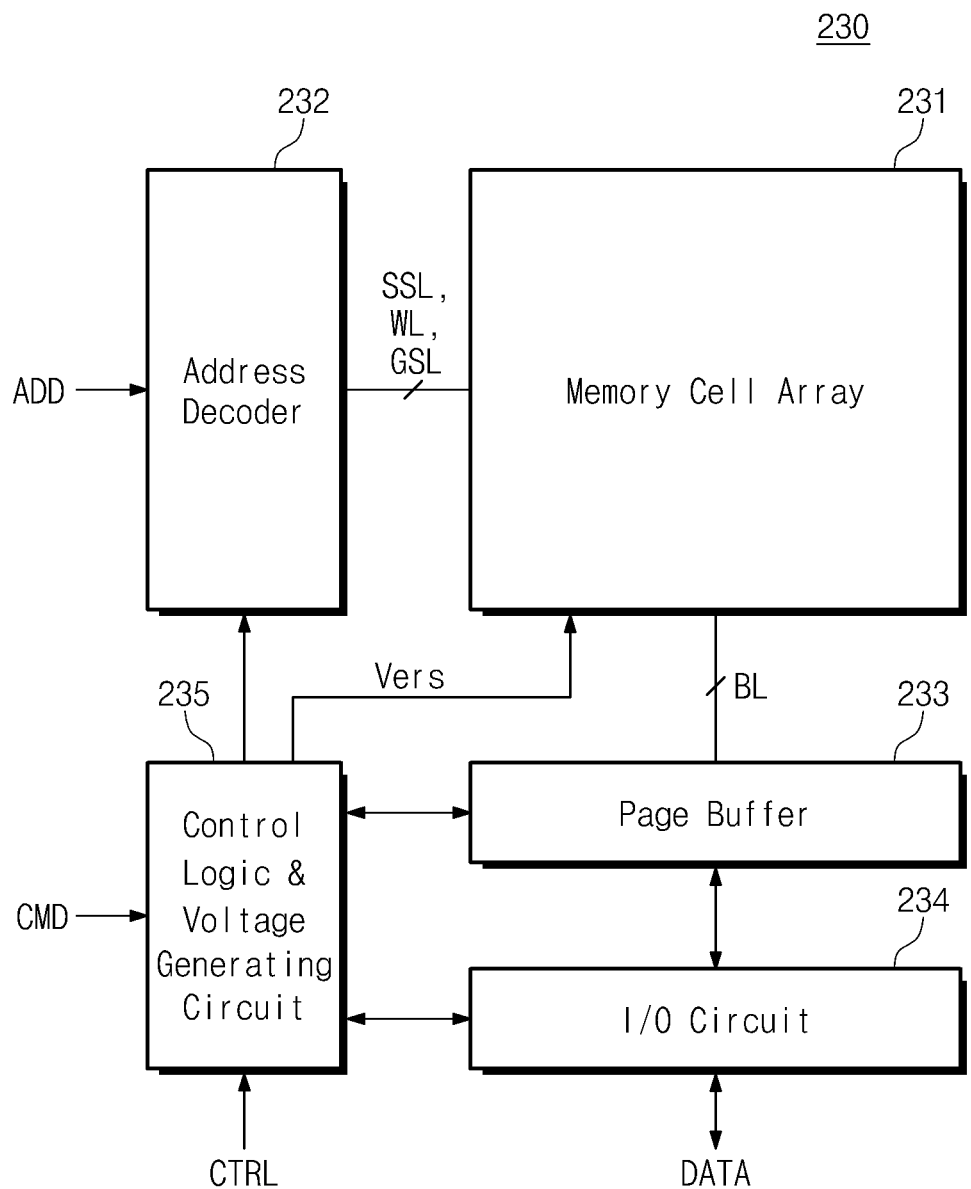
FIG. 13 is a block diagram illustrating a constitution of the nonvolatile memory described in FIG. 1 or 8.

FIG. 13 is a block diagram illustrating a constitution of the nonvolatile memory described in FIG. 1 or 8. The nonvolatile memory device 230 of FIG. 1 will representatively describe a function or a feature of each of the nonvolatile memory devices 230, 240 and 250. Referring to FIG. 13, the nonvolatile memory device 230 includes a memory cell array 231, an address decoder 232, a control logic & voltage generating circuit 235, a page buffer 233 and an input/output circuit 234.

The memory cell array 231 may include a plurality of memory blocks. Each of the memory blocks may include a plurality of cell strings. Each of the cell strings includes a plurality of memory cells. The memory cells may be connected to a plurality of word lines WL. Each of the memory cells may include a SLC (single level cell) storing 1-bit or a MLC (multi level cell) storing at least 2-bits of data.

The address decoder 232 is connected to the memory cell array 231 through a plurality of word lines WL, string select lines SSL, and ground select lines GSL. The address decoder 232 may receive a physical address ADD from an external device and may decode the received physical address ADD to drive the plurality of word lines WL. For example, the address decoder 232 can decode the physical address ADD received from the external device and can select at least one word line among the word lines WL on the basis of the decoded physical address ADD to drive the selected at least one word line.

The control logic & voltage generating circuit 235 can receive a storage command CMD and a control signal CTRL from an external device and can control the address decoder 232, the page buffer 233 and the input/output circuit 234 in response to the received signals. For example, the control logic & voltage generating circuit 235, in response to the signals CMD and CTRL, can control other constituent elements so that data is stored in the memory cell array 231. The control logic & voltage generating circuit 235, in response to the signals CMD and CTRL, can control other constituent elements so that data stored in the memory cell array 231 is output to an external device.

The page buffer 233 is connected to the memory cell array 231 through a plurality of bit lines BL. The page buffer 233 can control the bit lines BL so that data received from the input/output circuit 234 is stored in the memory cell array 231 according to a control of the control logic & voltage generating circuit 235. The page buffer circuit 233 can read data stored in the memory cell array 231 and can transmit the read data to the data input/output circuit 234 according to a control of the control logic & voltage generating circuit 235. The page buffer 233 can receive data from the input/output circuit 234 by a page unit or can read data from the memory cell array 231 by a page unit.

The input/output circuit 234 can receive data DATA from an external circuit and can transmit the received data to the page buffer 233. The input/output circuit 234 can receive data DATA from page buffer 233 and can transmit the received data to the external circuit. The input/output circuit 234 can transmit data to an external device or receive data from the external device in synchronization with the control signal CTRL.

The control logic & voltage generating circuit 235 can generate various voltages Vers required to operate the nonvolatile memory 230, 240 and 250. For example, the control logic & voltage generating circuit 235 can generate various voltages such as a plurality of program voltages, a plurality of pass voltages, a plurality of select read voltages, a plurality of unselect read voltages, and a plurality of erase voltages. The control logic & voltage generating circuit 235 can provide the generated various voltages to the address decoder 232 or a substrate of the memory cell array 231.

Figure 14:
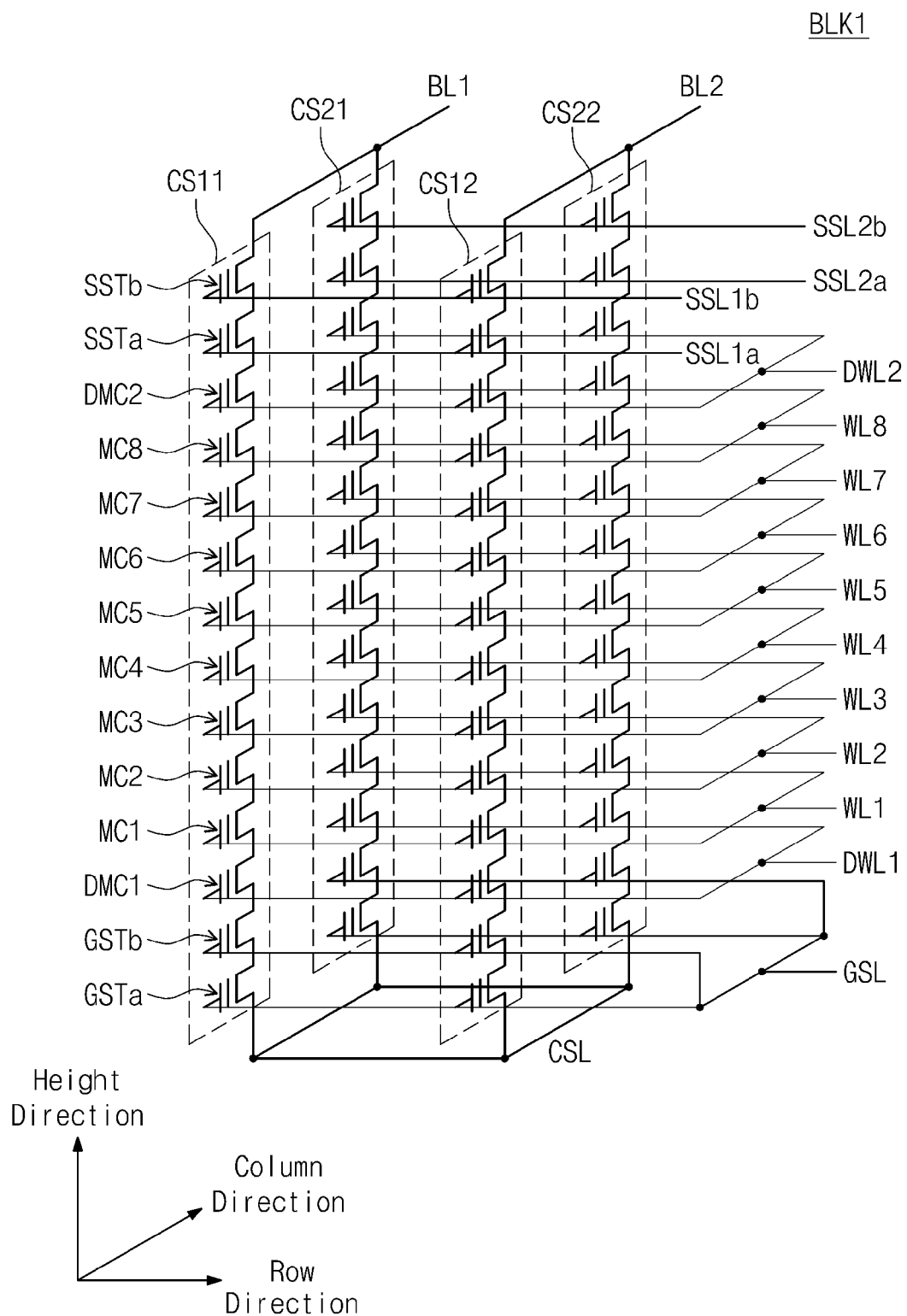
FIG. 14 is a circuit diagram illustrating an example of a first memory block among memory blocks included in a memory cell array of FIG. 13.

FIG. 14 is a circuit diagram illustrating an example of a first memory block among memory blocks included in a memory cell array of FIG. 13. A first memory block BLK1 having a three dimensional structure is described with reference to FIG. 14. However, the disclosure is not limited thereto and other memory blocks included in each of the nonvolatile memory 230, 240 and 250 may have the similar structure to the first memory block BLK1.

Referring to FIG. 14, the first memory block BLK1 includes a plurality of cell strings (CS11, CS12, CS21, CS22). The cell strings (CS11, CS12, CS21, CS22) may be arranged along a row direction and a column direction to form rows and columns.

For example, the cell strings (CS11, CS12) may be connected to string select lines (SSL1a, SSL1b) to form a first row. The cell strings (CS21, CS22) may be connected to string select lines (SSL2a, SSL2b) to form a second row.

For example, the cell strings (CS11, CS21) may be connected to a first bit line BL1 to form a first column. The cell strings (CS12, CS22) may be connected to a second bit line BL2 to form a second column.

Each of the cell strings (CS11, CS12, CS21, CS22) includes a plurality of cell transistors. For example, each of the cell strings (CS11, CS12, CS21, CS22) may include string select transistors (SSTa, SSTb), a plurality of memory cells MC1~MC8, ground select transistors (GSTa, GSTb) and dummy memory cells (DMC1, DMC2). Each of the cell transistors included in the cell strings (CS11, CS12, CS21, CS22) may be a CTF (charge trap flash) memory cell.

The memory cells MC1~MC8 are serially connected and are stacked in a height direction perpendicular to a plane formed by a row direction and a column direction. The string select transistors (SSTa, SSTb) are serially connected and may be provided between the memory cells MC1~MC8 and the bit line BL. The ground select transistors (GSTa, GSTb) are serially connected and may be provided between the memory cells MC1~MC8 and a CSL (common source line).

The first dummy memory cell DMC1 may be provided between the memory cells MC1~MC8 and the ground select transistors (GSTa, GSTb). The second dummy memory cell DMC2 may be provided between the memory cells MC1~MC8 and the string select transistors (SSTa, SSTb).

The ground select transistors (GSTa, GSTb) of the cell strings (CS11, CS12, CS21, CS22) may be connected to the ground select line GSL in common Ground select transistors of the same row may be connected to the same ground select line and ground select transistors of different rows may be connected to different ground select lines. For example, the first ground select transistors GSTa of the cell strings (CS11, CS12) of the first row may be connected to a first ground select line and the first ground select transistors GSTa of the cell strings (CS21, CS22) of the second row may be connected to a second ground select line.

Although not illustrated in the drawing, ground select transistors provided at the same height from a substrate (not shown) may be connected to the same ground select line and ground select transistors provided at different heights from the substrate may be connected to different ground select lines. The first ground select transistors GSTa of the cell strings (CS11, CS12, CS21, CS22) may be connected to the first ground select line and the second ground select transistors GSTb of the cell strings (CS11, CS12, CS21, CS22) may be connected to the second ground select line.

Memory cells at the same height from the ground select transistors (GSTa, GSTb) are connected to the same word line and memory cells at different heights are connected to different word lines. For example, the first through eighth memory cells MC1~MC8 of the cell strings (CS11, CS12, CS21, CS22) are connected to first through eighth word lines WL1~WL8 respectively in common.

Among the first string select transistors SSTa of the same height, the string select transistors of the same row are connected to the same string select line and string select transistors of different rows are connected to different string select lines. For example, the first string select transistors SSTa of the first row cell strings (CS11, CS12) are connected to the string select line SSL1a in common and the first string select transistors SSTa of the second row cell strings (CS21, CS22) are connected to the string select line SSL2a in common.

Similarly, among second string select transistors SSTb of the same height, the string select transistors of the same row are connected to the same string select line and string select transistors of different rows are connected to different string select lines. For example, the second string select transistors SSTb of the first row cell strings (CS11, CS12) are connected to the string select line SSL1b in common and the second string select transistors SSTb of the second row cell strings (CS21, CS22) are connected to the string select line SSL2b in common.

Although not illustrated in the drawing, string select transistors of cell strings of the same row may be connected to the same string select line in common. For example, the first and second string select transistors (SSTa, SSTb) of the cell strings (CS11, CS12) of the first row may be connected to the same string select line in common. The first and second string select transistors (SSTa, SSTb) of the cell strings (CS21, CS22) of the second row may be connected to the same string select line in common.

Dummy memory cells of the same height are connected to the same dummy word line and dummy memory cells of different heights are connected to different dummy word lines. For example, the first dummy memory cells DMC1 are connected to a first dummy word line DWL1 and the second dummy memory cells DMC2 are connected to a second dummy word line DWL2.

In the first memory block BLK1, read and write operations may be performed by a row unit. For example, one row of the first memory block BLK1 may be selected by the string select lines (SSL1a, SSL1b, SSL2a, SSL2b). For example, when a turn-on voltage is supplied to the string select lines (SSL1a, SSL1b) and a turn-off voltage is supplied to the string select lines (SSL2a, SSL2b), the cell strings (CS11, CS12) of the first row are connected to the bit lines (BL1, BL2). When a turn-on voltage is supplied to the string select lines (SSL2a, SSL2b) and a turn-off voltage is supplied to the string select lines (SSL1a, SSL1b), the cell strings (CS21, CS22) of the second row are connected to the bit lines (BL1, BL2) to be driven. Memory cells of the same height are selected among memory cells of a cell string of a row driven by driving a word line. Read and write operations may be performed in the selected memory cells. The selected memory cells may form a physical page unit.

In the first memory block BLK1, an erase operation may be performed by a memory block unit or a sub block unit. When an erase operation is performed by a memory block unit, all the memory cells MC of the first memory block BLK1 may be erased at the same time according to an erase request. When an erase operation is performed by a sub block unit, some of the memory cells MC of the first memory block BLK1 may be erased at the same time according to an erase request and the remaining memory cells may be erase-prohibited. A low voltage (e.g., a ground voltage) may be supplied to a word line connected to memory cells being erased and a word line connected to the erase-prohibited memory cells may be floated.

The first memory block BLK1 illustrated in FIG. 14 is illustrative, the number of cell strings may increase or decrease, and the number of rows and columns formed by cell strings may increase or decrease depending on the number of cell strings. The number of cell transistors (GST, MC, DMC, SST, etc.) of the first memory block BLK1 may increase or decrease respectively and a height of the first memory block BLK1 may increase or decrease depending on the number of the cell transistors. The number of lines (GSL, WL, DWL, SSL, etc.) connected to the cell transistors may increase or decrease depending on the number of the cell transistors.

Figure 15:
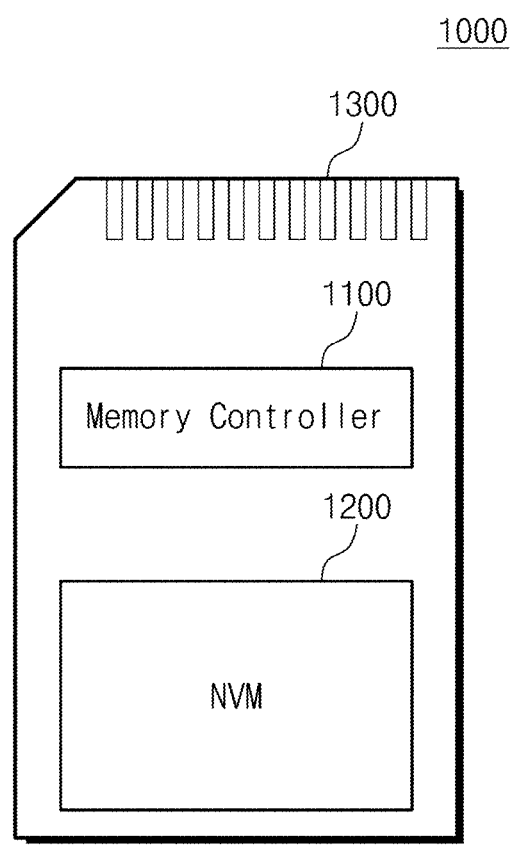
FIG. 15 is a block diagram illustrating a memory card system including a nonvolatile memory system in accordance with some embodiments of the disclosure.

FIG. 15 is a block diagram illustrating a memory card system including a nonvolatile memory system in accordance with some embodiments of the disclosure. Referring to FIG. 15, a memory card system 1000 includes a memory controller 1100, a nonvolatile memory 1200, and a connector 1300.

The memory controller 1100 is connected to the nonvolatile memory 1200. The memory controller 1100 is configured to access the nonvolatile memory 1200. For example, the memory controller 1100 is configured to control read, write, erase and background operations of the nonvolatile memory 1200. The background operation includes operations such as a wear level management, a garbage collection, etc. The memory controller 1100 may perform an anticipatory load operation of a host memory buffer (not illustrated) or a redirection operation like the storage controller 210 and 410 described with reference to FIGS. 1 and 8.

The memory controller 1100 is configured to provide an interface between the nonvolatile memory 1200 and a host. The memory controller 1100 is configured to drive firmware for controlling the nonvolatile memory 1200. The memory controller 1100 may include constituent elements such as a RAM (random access memory), a processing unit, a host interface, a memory interface, an error correction unit.

The memory controller 1100 can communicate with an external device through the connector 1300. The memory controller 1100 can communicate with an external device (e.g., host) according to specific communication standards. The memory controller 1100 is configured to communicate with an external device through at least one of various communication standards such as a USB (universal serial bus), am MMC (multimedia card), an eMMC (embedded MMC), a PCI (peripheral component interconnection), a PCIe (PCI express), an ATA (advanced technology attachment), a serial-ATA, a parallel-ATA, an SCSI (small computer system interface), an ESDI (enhanced small disk interface), an IDE (integrated drive electronics), a Firewire, a UFS (universal flash storage), an NVMe (nonvolatile memory express), etc.

The nonvolatile memory 1200 may be embodied by various nonvolatile memory devices such as an EPROM (electrically erasable and programmable ROM), a NAND flash memory, a NOR flash memory, a PRAM (phase-change RAM), a ReRAM (resistive RAM), a FRAM (ferroelectric RAM), a STT-MRAM (spin-torque magnetic RAM), etc.

The memory controller 1100 and the nonvolatile memory 1200 may be integrated into one semiconductor device. The memory controller 1100 and the nonvolatile memory 1200 may be integrated into one semiconductor device to constitute an SSD (solid state drive). The memory controller 1100 and the nonvolatile memory 1200 may be integrated into one semiconductor device to constitute a memory card. For example, the memory controller 1100 and the nonvolatile memory 1200 may be integrated into one semiconductor device to constitute a memory card such as a personal computer memory card international association (PCMCIA) card, a compact flash (CF) card, a smart media card (SM, SMC), a memory stick, a multimedia card (MMC, RS-MMC, MMCmicro), an SD card (SD, miniSD, microSD, SDHC), a universal flash storage (UFS), etc.

Figure 16:
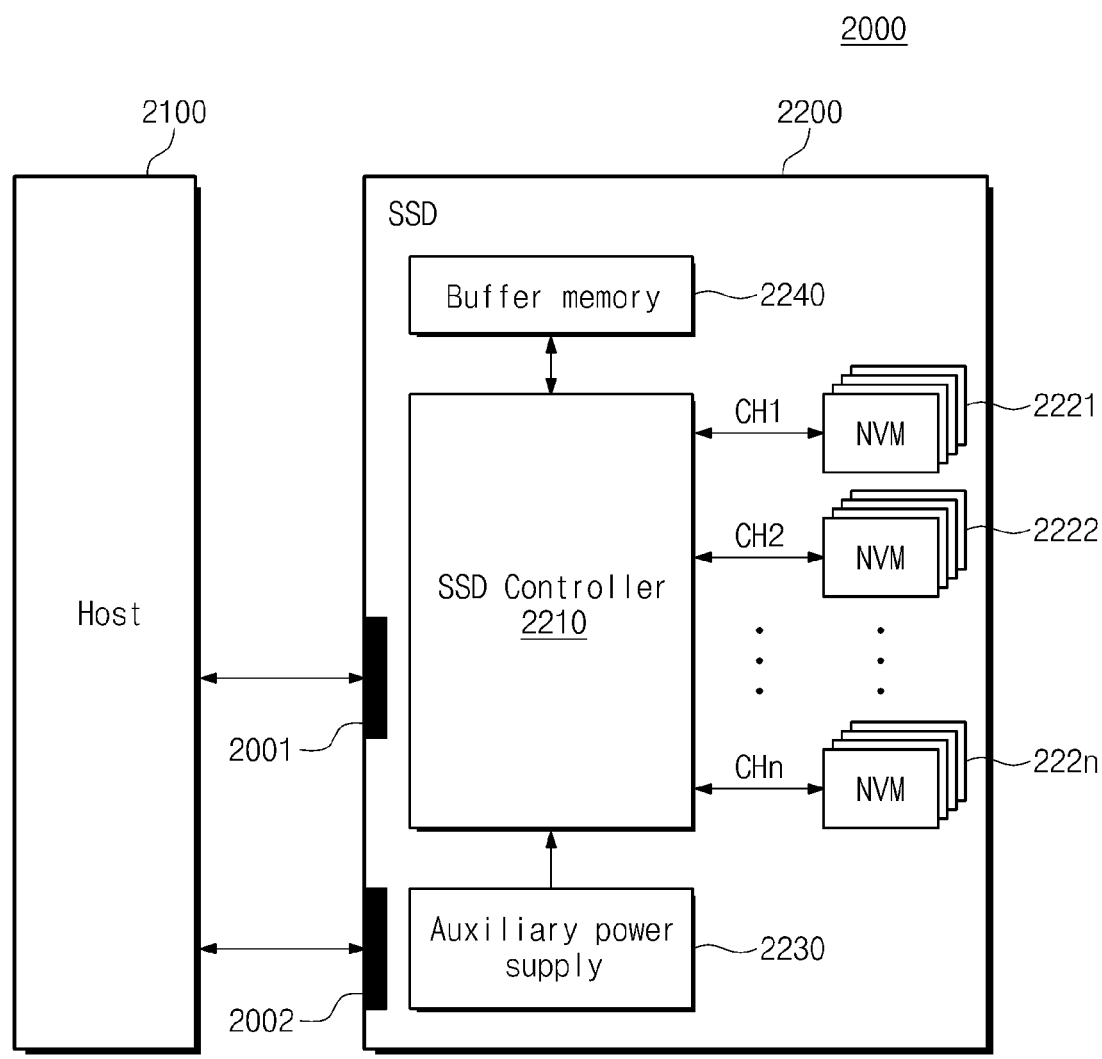
FIG. 16 is a block diagram illustrating an SSD (solid state drive) system including a nonvolatile memory system in accordance with some embodiments of the disclosure.

FIG. 16 is a block diagram illustrating an SSD (solid state drive) system including a nonvolatile memory system in accordance with some embodiments of the disclosure. Referring to FIG. 16, an SSD system 2000 includes a host 2100 and an SSD 2200. The SSD 2200 exchanges a signal with the host 2100 through a signal connector 2001 and is inputted with power through a power supply connector 2002. The SSD 2200 includes an SSD controller 2210, a plurality of flash memories 2221~222n, an auxiliary power supply device 2230 and a buffer memory 2240.

The SSD controller 2210 can control the plurality of flash memories 2221~222n in response to a signal received from the host 2100. The SSD controller 2210 can perform the anticipatory load operation and the redirection operation described with reference to FIGS. 1 and 8.

The auxiliary power supply device 2230 is connected to the host 2100 through the power supply connector 2002. The auxiliary power supply device 2230 may be inputted with power from the host 2100 to be charged. In a case where a power supply from the host 2100 is not enough, the auxiliary power supply device 2230 may provide a power supply of the SSD system 2000.

The buffer memory 2240 operates as a buffer memory of the SSD 2200. For example, the buffer memory 2240 may temporarily store data received from the host 2100 or the flash memories 2221~222n, or may temporarily store meta data (e.g., a mapping table) of the flash memories 2221~222n. The buffer memory 2240 may include a volatile memory such as DRAM, SDRAM, DDR SDRAM, LPDDR SDRAM, SRAM, etc. or a nonvolatile memory such as FRAM, ReRAM, STT-RAM, PRAM, etc.

Figure 17:
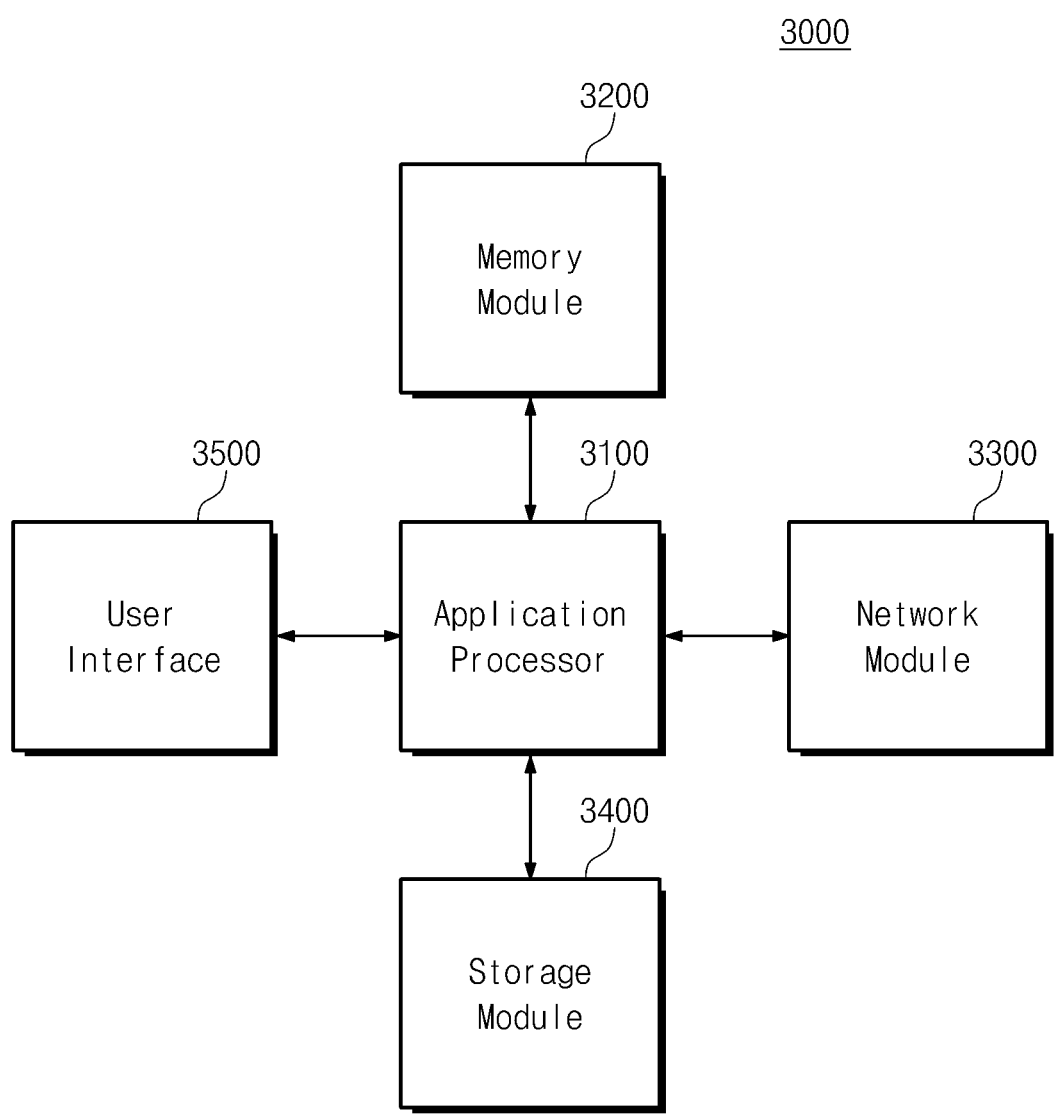
FIG. 17 is a block diagram illustrating a user system including a nonvolatile memory system in accordance with some embodiments of the disclosure.

FIG. 17 is a block diagram illustrating a user system including a nonvolatile memory system in accordance with some embodiments of the disclosure. Referring to FIG. 17, a user system 3000 includes an application processor 3100, a memory module 3200, a network module 3300, a storage module 3400, and a user interface 3500.

The application processor 3100 can drive constituent elements, an OS (operating system), etc. included in the user system 3000. The application processor 3100 may include controllers that control constituent elements included in the user system 3000, interfaces, a graphic engine, etc. The application processor 3100 may be provided as an SoC (system on chip).

The memory module 3200 may operate as a main memory, an operation memory, a buffer memory, or a cache memory of the user system 3000. The memory module 3200 may include a volatile memory such as DRAM, SDRAM, DDR SDRAM, DDR2 SDRAM, DDR3 SDRAM, LPDDR SDRAM, LPDDR3 SDRAM, SRAM, etc. or a nonvolatile memory such as PRAM, FRAM, ReRAM, MRAM, etc.

The network module 3300 can perform a communication with external devices. The network module 3300 can support a wireless communication such as a CDMA (code division multiple access), a GSM (global system for mobile communication), a WCDMA (wideband CDMA), a CDMA-2000, a TDMA (time division multiple access), an LTE (long term evolution), a Wimax, a WLAN, a UWB, a blue tooth, a WI-DI, etc. The network module 3300 may be included in the application processor 3100.

The storage module 3400 can store data. For example, the storage module 3400 can store data received from the application processor 3100. The storage module 3400 can transmit data stored in the storage module 3400 to the application processor 3100. The storage module 3400 may be embodied a nonvolatile semiconductor memory device such as a PRAM (phase change RAM), an MRAM (magnetic RAM), an RRAM (resistive RAM), a NAND flash, a NOR flash, a three-dimensional structure NAND flash, etc.

The storage module 3400 can perform the anticipatory load operation and the redirection operation described with reference to FIGS. 1 and 8. The storage module 3400 can communicate with the application processor 3100 based on the predetermined interface. The storage module 3400 can adjust performance time of a garbage collection on the basis of a write command received from the application processor 3100.

The user interface 3500 may input data or a command to the application processor 3100 or may include interfaces that output data to an external device. The user interface 3500 may include user input interfaces such as a keyboard, a keypad, a button, a touch panel, a touch screen, a touch pad, a touch ball, a camera, a mike, a gyroscope sensor, a vibration sensor, a piezoelectric element, etc. The user interface 3500 may include user output interfaces such as a liquid crystal display (LCD), an organic light emitting diode (OLED) display, an active matrix OLED (AMOLED) display, an LED, a speaker, a motor, etc.

The memory card, the nonvolatile memory device, and the card controller according to the disclosure may be mounted using various types of packages. For example, the flash memory device and/or the memory controller may be mounted using various types of packages such as package on package (PoP), ball grid array (BGA), chip scale package (CSP), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline (SOIC), shrink small outline package (SSOP), thin small outline (TSOP), thin quad flatpack (TQFP), system in package (SIP), multi chip package (MCP), wafer-level fabricated package (WFP) and wafer-level processed stack package (WSP).

According to the embodiments of the disclosure, it is possible to improve an access speed of a storage device having an interface capable of sharing resources of a host memory buffer and to effectively manage memory resources.

As is traditional in the field, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The above-disclosed subject matter is to be considered illustrative, and not restrictive, and the appended claims are intended to cover all such modifications, enhancements, and other embodiments, which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. An operation method executed by a storage device connected to a host through an interface sharing a memory buffer of the host, the method comprising:
receiving an access command from the host;
anticipating data expected to be requested by the host with reference to the access command;
reading out the anticipated data from a nonvolatile memory device to load the read data to a first area of the memory buffer; and
in a case of being requested to load the anticipated data into a second area of the memory buffer by the host, moving the anticipated data from the first area to the second area.

2. The operation method of claim 1, wherein the host communicates with the storage device according to a peripheral component interconnection (PCI) express standard.

3. The operation method of claim 1, wherein the storage device anticipates the data that will be requested with reference to a name space, a data tag, a task ID, or a process ID that are included in the access command.

4. The operation method of claim 1, wherein the storage device anticipates the data that will be requested with reference to a logical address included in the access command.

5. The operation method of claim 1, wherein the data expected to be requested by the host has a logical address that is consecutive to a previously-received logical address.

6. The operation method of claim 1, wherein the storage device, in a case where the same logical address is repeatedly received in access commands from the host more than a reference number of times within a reference time, identifies data corresponding to the logical address as the anticipated data.

7. The operation method of claim 1, wherein the storage device anticipates the data that will be requested later with reference to internal setting information.

8. The operation method of claim 7, wherein the internal setting information comprises an interleaving sequence.

9. The operation method of claim 1, wherein the storage device controls the memory buffer to move the anticipated data from the first area to the second area.

10. The operation method of claim 1, wherein the storage device transmits an address of the first area to the host, thereby inducing the host to move the anticipated data from the first area to the second area.

11. The operation method of claim 1, wherein the storage device transmits an address of the first area to the host, thereby inducing the host to transmit a movement command to the storage device for moving the anticipated data.

12. The operation method of claim 1, wherein the storage device corrects address mapping information of the memory buffer to transform an address of the first area into an address of the second area.

13. The operation method of claim 1, wherein the nonvolatile memory device comprises a three-dimensional memory array.

14. A storage device connected to a host through an interface sharing a memory buffer of the host, the storage device comprising:
- a plurality of nonvolatile memory devices;
- an internal buffer for buffering data being exchanged with the host; and
- a storage controller that anticipates data expected to be subsequently requested by the host with reference to an access command from the host and reads out the anticipated data from the nonvolatile memory devices or the internal buffer to load the read data in a source area of the memory buffer.

15. The storage device of claim 14, wherein the storage controller, in a case of being requested to load the anticipated data into a target area of the memory buffer from the host, moves the anticipated data from the source area of the memory buffer to the target area.

16. A storage device that buffers data within a memory buffer of an external host, the storage device comprising:
- a nonvolatile memory; and
- a memory controller, wherein the memory controller:
    - receives, from the host, a request to access the nonvolatile memory,
    - identifies data that is anticipated to be subsequently requested by the host based upon the received access request,
    - reads the anticipated data from the nonvolatile memory, and
    - writes the anticipated data into a first area of the memory buffer.

17. The storage device of claim 16, wherein the memory controller further:
- receives, from the host, another access request directing the memory controller to retrieve first data from the nonvolatile memory;
- determines whether the first data and anticipated data are the same data based upon an address of the first data communicated with the other access request; and
- writes the anticipated data stored in the first area of the memory buffer to a second area of the memory buffer when the first data and anticipated data are determined to be the same data.

18. The storage device of claim 16, wherein the memory controller further:
- receives, from the host, another access request directing the memory controller to retrieve first data from the nonvolatile memory;
- determines whether the first data and anticipated data are the same data based upon an address of the first data communicated with the other access request; and
- communicates, to the host, an address of the first area of the memory buffer when the first data and anticipated data are determined to be the same data.

19. The storage device of claim 16, wherein the anticipated data is identified in accordance with a sequence of logical addresses received in access requests from the host.

20. The storage device of claim 16, wherein the anticipated data is identified in accordance with the frequency with which the memory controller receives, from the host, access requests directed toward a logical address corresponding to the anticipated data.

* * * * *